United States Patent
Yamamoto

(10) Patent No.: US 11,319,695 B2
(45) Date of Patent: May 3, 2022

(54) SHOVEL

(71) Applicant: SUMITOMO CONSTRUCTION MACHINERY CO., LTD., Tokyo (JP)

(72) Inventor: Takashi Yamamoto, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 212 days.

(21) Appl. No.: 16/809,781

(22) Filed: Mar. 5, 2020

(65) Prior Publication Data

US 2020/0199851 A1  Jun. 25, 2020

Related U.S. Application Data

(63) Continuation of application No. PCT/JP2018/025061, filed on Jul. 2, 2018.

(30) Foreign Application Priority Data

Sep. 7, 2017  (JP) .............................. JP2017-172433

(51) Int. Cl.
*E02F 9/26* (2006.01)
*B60K 35/00* (2006.01)
(Continued)

(52) U.S. Cl.
CPC ................ *E02F 9/26* (2013.01); *B60K 35/00* (2013.01); *B60Q 9/00* (2013.01); *E02F 3/32* (2013.01);
(Continued)

(58) Field of Classification Search
CPC ........ B60K 2370/152; B60K 2370/178; B60K 2370/61; B60K 35/00; B60Y 2300/095;
(Continued)

(56) References Cited

U.S. PATENT DOCUMENTS 8,768,581 B2 *  7/2014  Mizuochi ............... B66C 23/905
   701/50
9,745,727 B2 *  8/2017  Galan ...................... E02F 9/24
(Continued)

FOREIGN PATENT DOCUMENTS

JP    S60-199130    10/1985
JP    H05-086636    4/1993
(Continued)

OTHER PUBLICATIONS

International Search Report for PCT/JP2018/025061 dated Sep. 11, 2018.

*Primary Examiner* — Tyler J Lee
(74) *Attorney, Agent, or Firm* — IPUSA, PLLC

(57) ABSTRACT

A shovel includes a traveling body, a turning body turnably mounted on the traveling body, an attachment attached to the turning body and including a boom, an arm, and a bucket, and a hardware processor. The hardware processor is configured to output a warning about the operation of at least one of the traveling body, the turning body, and the attachment when the shovel is on sloping ground or is likely to enter sloping ground. The hardware processor is configured to output the warning when the traveling body is traveling on the sloping ground in a downward direction or is likely to travel on the sloping ground in the downward direction. The warning alerts an operator to the tipping of the shovel in the downward direction of the sloping ground.

10 Claims, 15 Drawing Sheets

(51) Int. Cl.
    *B60Q 9/00*     (2006.01)
    *E02F 3/32*     (2006.01)
    *E02F 9/20*     (2006.01)
    *G09B 19/16*     (2006.01)
    *E02F 9/24*     (2006.01)

(52) U.S. Cl.
    CPC .............. *E02F 9/2033* (2013.01); *E02F 9/24* (2013.01); *E02F 9/265* (2013.01); *G09B 19/167* (2013.01); *B60K 2370/152* (2019.05)

(58) Field of Classification Search
    CPC ... E02F 3/32; E02F 9/2033; E02F 9/24; E02F 9/26; E02F 9/262; E02F 9/265; G09B 19/167; G09B 19/24; B60Q 9/00
    See application file for complete search history.

(56) References Cited

U.S. PATENT DOCUMENTS

| | | | | |
|---|---|---|---|---|
| 9,970,179 | B2* | 5/2018 | Lafrenier | B66C 15/06 |
| 10,858,808 | B2* | 12/2020 | Okada | E02F 9/20 |
| 10,860,016 | B1* | 12/2020 | Wang | E02F 9/262 |
| 11,015,320 | B2* | 5/2021 | Zhou | E02F 9/2292 |
| 11,142,442 | B2* | 10/2021 | Gault | B66F 17/003 |
| 2008/0262682 | A1* | 10/2008 | Bergsten | B60T 8/1766 701/50 |
| 2012/0232763 | A1* | 9/2012 | Mizuochi | B66C 23/905 701/50 |
| 2013/0066527 | A1* | 3/2013 | Mizuochi | B66C 23/905 701/50 |
| 2015/0345114 | A1 | 12/2015 | Nomura et al. | |
| 2016/0122969 | A1* | 5/2016 | Noborio | E02F 3/847 701/50 |
| 2017/0130429 | A1 | 5/2017 | Lafrenier | |
| 2018/0016771 | A1 | 1/2018 | Izumikawa | |
| 2018/0245313 | A1* | 8/2018 | Shibamori | E02F 9/24 |

FOREIGN PATENT DOCUMENTS

| | | |
|---|---|---|
| JP | 2000-104290 | 4/2000 |
| JP | 2010-196253 | 9/2010 |
| JP | 2014-074319 | 4/2014 |
| JP | 2015-214808 | 12/2015 |
| JP | 2016-084663 | 5/2016 |
| JP | 2016-223096 | 12/2016 |
| JP | 2017-145626 | 8/2017 |
| KR | 1020090034618 | 4/2009 |
| WO | 2016/085000 | 6/2016 |
| WO | 2016/158539 | 10/2016 |

\* cited by examiner

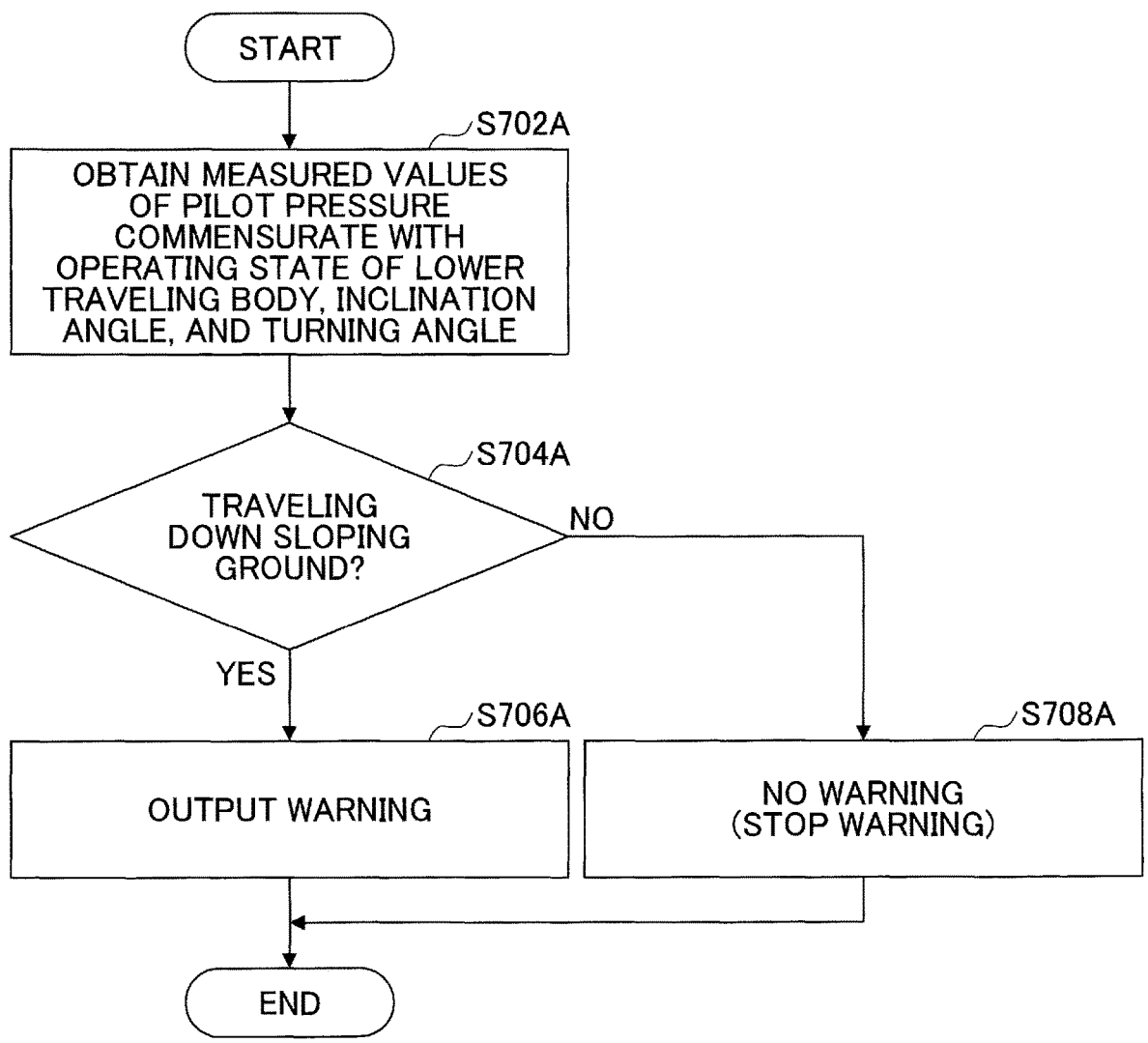

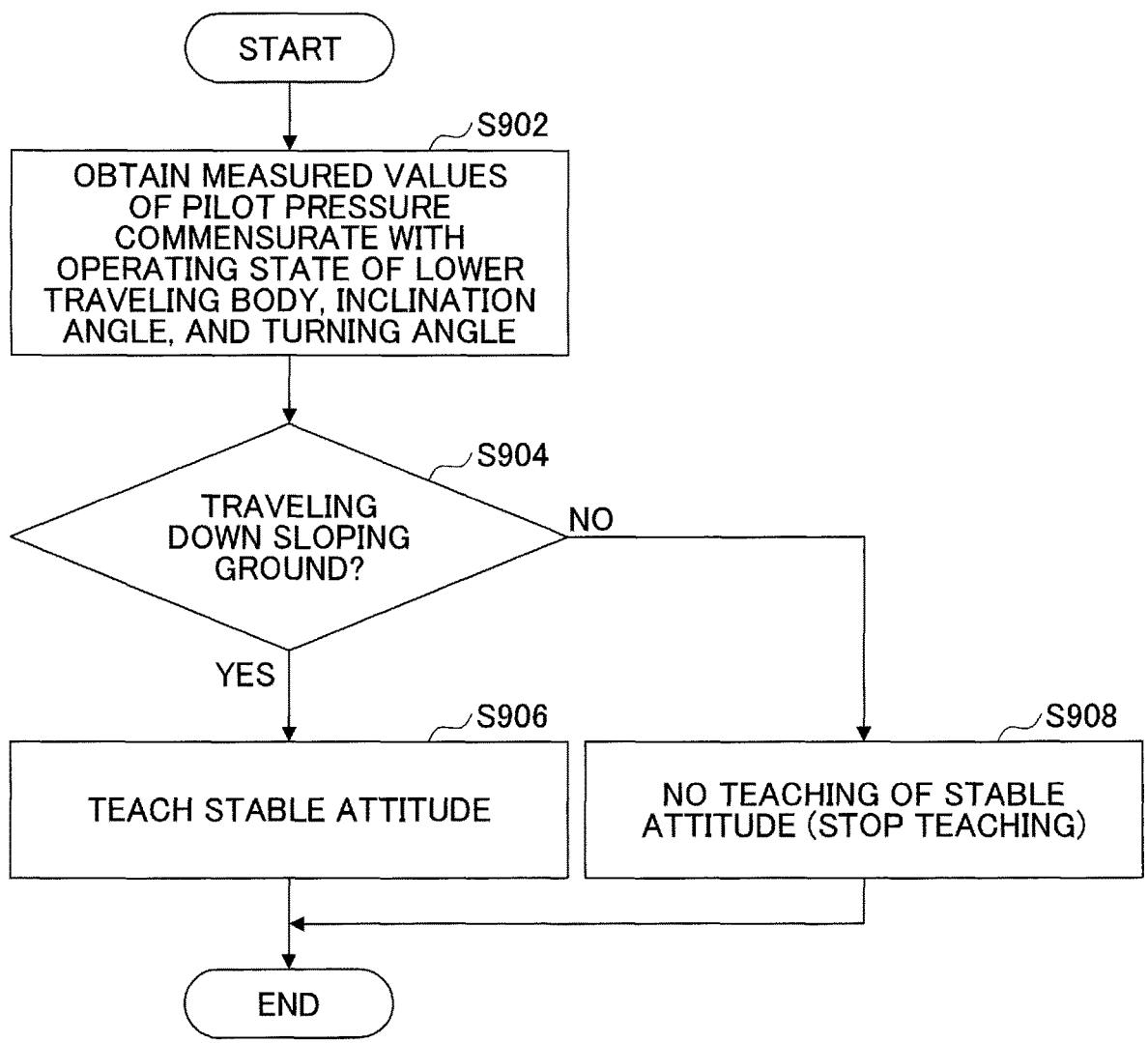

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2018/025061, filed on Jul. 2, 2018 and designating the U.S., which claims priority to Japanese patent application No. 2017-172433, filed on Sep. 7, 2017. The entire contents of the foregoing applications are incorporated herein by reference.

BACKGROUND

Technical Field

The present invention relates to shovels.

Description of Related Art

Shovels are used in various environments. For example, there is a shovel that performs work on sloping ground.

SUMMARY

According to an aspect of the present invention, a shovel includes a traveling body, a turning body turnably mounted on the traveling body, an attachment attached to the turning body and including a boom, an arm, and a bucket, and a hardware processor. The hardware processor is configured to output a warning about the operation of at least one of the traveling body, the turning body, and the attachment when the shovel is on sloping ground or is likely to enter sloping ground. The hardware processor is configured to output the warning when the traveling body is traveling on the sloping ground in a downward direction or is likely to travel on the sloping ground in the downward direction. The warning alerts an operator to the tipping of the shovel in the downward direction of the sloping ground.

BRIEF DESCRIPTION OF THE DRAWINGS

FIG. 7A is a flowchart schematically illustrating an example of a warning outputting process by a controller;

FIG. 9 is a flowchart schematically illustrating an example of a stable attitude teaching process by the controller;

DETAILED DESCRIPTION

As described above, there is a shovel that performs work on sloping ground. On sloping ground, however, the shovel's attitude becomes unstable depending on the posture state or the state of movement of the attachment, and the shovel may tip in the downward direction of sloping ground.

Normally, however, the safe operation of a shovel for avoiding tipping in a downward direction on sloping ground is achieved through the safety awareness of individual persons, on-site safety education, etc. Therefore, there is room for improvement in safety for avoiding tipping in a downward direction on sloping ground on the part of a shovel.

Therefore, a shovel that can prevent tipping in a downward direction on sloping ground is desired.

According to an aspect of the present invention, a shovel that can prevent tipping in a downward direction is provided.

An embodiment of the invention is described with reference to the drawings.

[Overview of Shovel]

Figure 1:
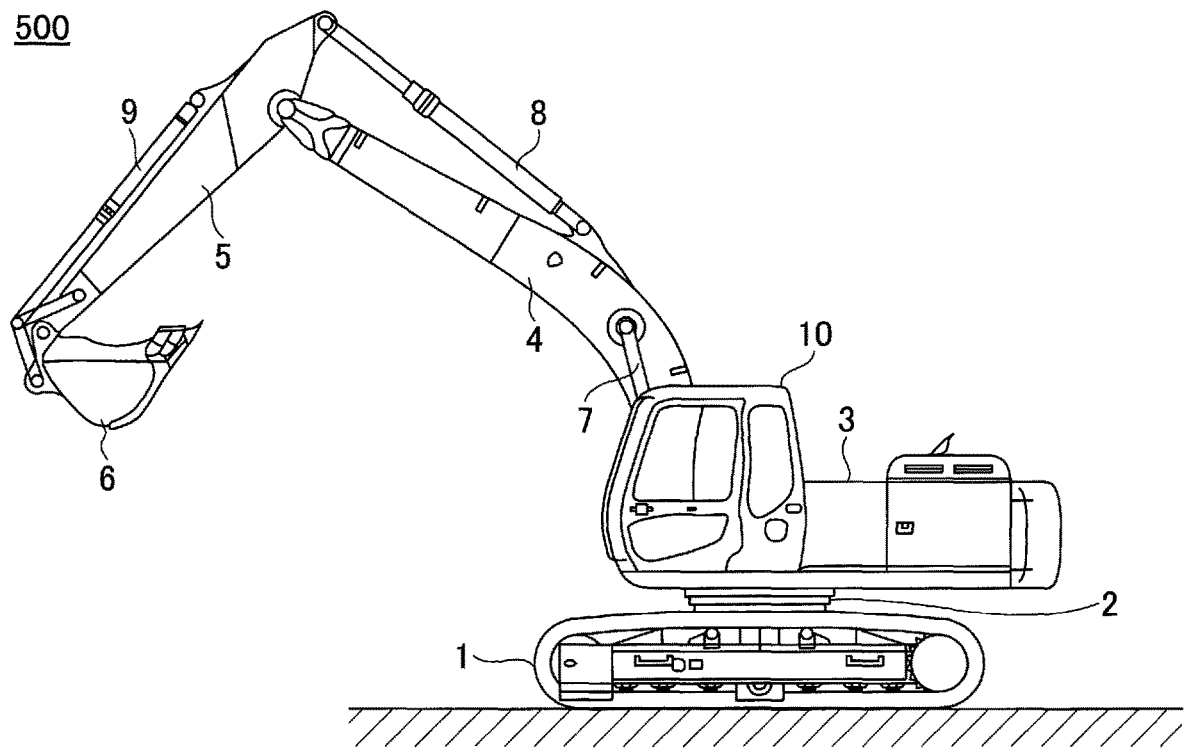
FIG. 1 is a side view of a shovel.

First, an overview of a shovel 500 according to the embodiment is given with reference to FIG. 1.

FIG. 1 is a side view of the shovel 500 according to the embodiment.

The shovel 500 according to the embodiment includes a lower traveling body 1; an upper turning body 3 turnably mounted on the lower traveling body 1 via a turning mechanism 2; a boom 4, an arm 5 and a bucket 6 serving as an attachment (work apparatus); and a cabin 10 in which an operator sits. Hereinafter, the front side of the shovel 500 corresponds to a direction in which the attachment extends relative to the upper turning body 3 (hereinafter referred to as "orientation of the attachment" for convenience) in a plan view of the shovel 500 from directly above along the turning axis of the upper turning body 3 (hereinafter simply referred to as "plan view"). Furthermore, the left side and the right side of the shovel 500 correspond to the left side and the right side, respectively, of the operator in the cabin 10 in the plan view of the shovel 500.

The lower traveling body 1 (an example of a traveling body) includes, for example, a pair of right and left crawlers, which are hydraulically driven by travel hydraulic motors 1A and 1B (see FIG. 2), respectively, to cause the shovel 500 to travel.

The upper turning body 3 (an example of a turning body) is driven by a turning hydraulic motor 21 (see FIG. 2) to turn relative to the lower traveling body 1.

The boom 4 is pivotably attached to the front center of the upper turning body 3 to be movable upward and downward. The arm 5 is pivotably attached to the distal end of the boom 4 to be pivotable upward and downward. The bucket 6 is pivotably attached to the distal end of the arm 5 to be pivotably upward and downward. The boom 4, the arm 5, and the bucket 6 are hydraulically driven by a boom cylinder 7, an arm cylinder 8, and a bucket cylinder 9, respectively, which serve as hydraulic actuators.

The cabin 10 is an operator room in which the operator sits, and is mounted on the front left of the upper turning body 3. The cabin 10 is provided with a transparent window that separates the inside and outside of the cabin 10. At least part of the window can be opened and closed. Furthermore, the operator seat of the cabin 10 is provided with a seat belt that holds the operator in the operator seat.

[Basic Structure of Shovel]

Next, a basic structure of the shovel 500 is described with reference to FIG. 2.

Figure 2:
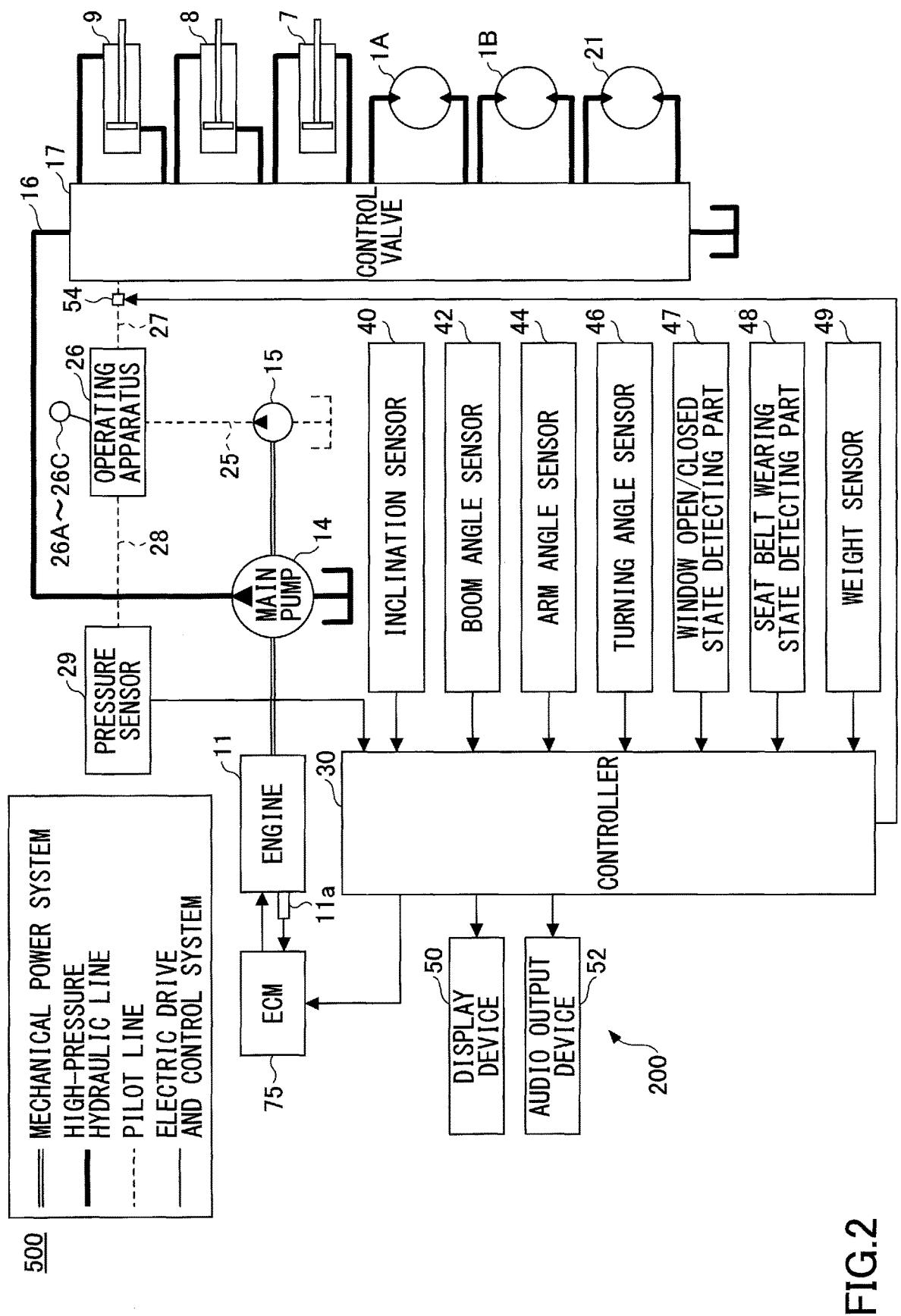
FIG. 2 is a block diagram illustrating an example configuration of the shovel.

FIG. 2 is a block diagram illustrating an example configuration of the shovel 500 according to the embodiment.

In the drawing, a mechanical power system, a high-pressure hydraulic line, a pilot line, and an electric drive and control system are indicated by a double line, a thick solid line, a dashed line, and a thin solid line, respectively.

A hydraulic drive system that hydraulically drives the hydraulic actuators of the shovel 500 according to the embodiment includes an engine 11, a main pump 14, and a control valve 17. Furthermore, the hydraulic drive system of the shovel 500 according to the embodiment includes hydraulic actuators such as the travel hydraulic motors 1A and 1B, the turning hydraulic motor 21, the boom cylinder 7, the arm cylinder 8, and the bucket cylinder 9 that hydraulically drive the lower traveling body 1, the upper turning body 3, the boom 4, the arm 5, and the bucket 6, respectively, as described above.

The engine 11 is a main power source in the hydraulic drive system, and is mounted on the back of the upper turning body 3, for example. Specifically, the engine 11 rotates constantly at a preset target rotational speed under the control of a below-described engine control module (ECM) 75 to drive the main pump 14 and a pilot pump 15. The engine 11 is, for example, a diesel engine fueled with diesel fuel.

The main pump 14 is, for example, mounted on the back of the upper turning body 3 the same as the engine 11, and supplies hydraulic oil to the control valve 17 through a high-pressure hydraulic line 16. As described above, the main pump 14 is driven by the engine 11. The main pump 14 is, for example, a variable displacement hydraulic pump, and its discharge flow rate (discharge pressure) can be controlled by a regulator (not depicted) controlling the angle (tilt angle) of a swash plate to adjust the stroke length of a piston under the control of a controller 30 as described below.

The control valve 17 is, for example, a hydraulic control device that is mounted in the center of the upper turning body 3 to control the hydraulic drive system according as the operator operates an operating apparatus 26. As described above, the control valve 17 is connected to the main pump 14 through the high-pressure hydraulic line 16, and selectively supplies hydraulic oil supplied from the main pump 14 to the travel hydraulic motors 1A (right) and 1B (left), the turning hydraulic motor 21, the boom cylinder 7, the arm cylinder 8, and the bucket cylinder 9, which are hydraulic actuators, in accordance with the operating state of the operating apparatus 26. Specifically, the control valve 17 is a valve unit including multiple hydraulic control valves (directional control valves) that control the flow rate and flow direction of hydraulic oil supplied from the main pump 14 to the hydraulic actuators.

The operation system of the shovel 500 according to the embodiment includes the pilot pump 15 and the operating apparatus 26.

The pilot pump 15 is, for example, mounted on the back of the upper turning body 3 and supplies a pilot pressure to the operating apparatus 26 via a pilot line 25. The pilot pump 15 is, for example, a fixed displacement hydraulic pump and is driven by the engine 11.

The operating apparatus 26 includes levers 26A and 26B and a pedal 26C. The operating apparatus 26 is an operation inputting part provided near the operator seat of the cabin 10 and serves for the operator to operate various motion elements (the lower traveling body 1, the upper turning body 3, the boom 4, the arm 5, the bucket 6, etc.). In other words, the operating apparatus 26 is an operation inputting part for operating hydraulic actuators that drive the motion elements (namely, the travel hydraulic motors 1A and 1B, the turning hydraulic motor 21, the boom cylinder 7, the arm cylinder 8, the bucket cylinder 9, etc.). The operating apparatus 26 (namely, the levers 26A and 26B and the pedal 26C) is connected to the control valve 17 via a hydraulic line 27. As a result, pilot signals (pilot pressures) commensurate with the operating states of the lower traveling body 1, the upper turning body 3, the boom 4, the arm 5, and the bucket 6 in the operating apparatus 26 are input to the control valve 17. Therefore, the control valve 17 can drive the hydraulic actuators in accordance with the operating states in the operating apparatus 26. Furthermore, the operating apparatus 26 is connected to a pressure sensor 29 via a hydraulic line 28. The following description assumes that the lower traveling body 1 is operated with the pedal 26C.

The control system of the shovel 500 according to the embodiment includes the controller 30, the pressure sensor 29, the ECM 75, and an engine rotational speed sensor 11a. Furthermore, the control system of the shovel 500 according to the embodiment includes an inclination sensor 40, a boom angle sensor 42, an arm angle sensor 44, a turning angle sensor 46, a window open/closed state detecting part 47, a seat belt wearing state detecting part 48, a display device 50, an audio output device 52, and a reducing valve 54 as a configuration for below-described attitude stabilization control and occupant protection control.

The controller 30 is an electronic control unit that controls the driving of the shovel 500. For example, the controller 30 sets a target rotational speed based on a work mode or the like preset by a predetermined operation by the operator or the like, and performs drive control to rotate the engine 11 at a constant speed via the ECM 75. Furthermore, the controller 30 controls a hydraulic circuit including the control valve 17, which drives hydraulic actuators, based on the detected values of pilot pressures commensurate with the operating states of various motion elements (namely, various hydraulic actuators) in the operating apparatus 26, input from the pressure sensor 29. Furthermore, when the shovel 500 is on sloping ground or when a predetermined condition that is satisfied when there is the possibility of entering sloping ground (below-described control application condition) is satisfied, the controller 30 performs such control as to encourage the operator to achieve such an attitude state of the shovel 500 as to prevent the tipping of the shovel 500 in the downward direction of sloping ground (hereinafter referred to as "the stable attitude of the shovel 500") (hereinafter, "attitude stabilization control"). Likewise, when the control application condition is satisfied, the controller 30 performs control for the protection of an occupant such as an operator of the shovel 500 (hereinafter, "occupant protection control"). The attitude stabilization control and occupant protection control by the controller 30 are described in detail below.

As described above, the pressure sensor 29 is connected to the operating apparatus 26 via the hydraulic line 28, and detects the secondary-side pilot pressure of the operating apparatus 26, namely, a pilot pressure commensurate with the operating state of each motion element (hydraulic actuator) in the operating apparatus 26. The pressure sensor 29 is connected to the controller 30 in such a manner as to be able to communicate with the controller 30 via a one-to-one communication line or an in-vehicle network such as a CAN (Controller Area Network). The detection signals of pilot pressures commensurate with the operating states of the upper turning body 3, the boom 4, the arm 5, the bucket 6, etc., in the operating apparatus 26 are input to the controller 30.

The functions of the controller 30 may be implemented by hardware, software, or their combination as desired. For example, the controller 30 is composed of a microcomputer including a CPU (Central Processing Unit), a ROM (Read Only Memory), a RAM (Random Access Memory), a secondary storage, and an I/O (Input-Output) interface. The CPU executes various programs stored in the ROM or the secondary storage to implement various functions.

Some functions of the controller 30 may be implemented by another controller. That is, the functions of the controller 30 may be distributed among and implemented by multiple controllers.

The ECM 75 controls the driving of the engine 11 based on a control command from the controller 30. For example, the ECM 75 generates a torque command for the engine 11 such that the engine 11 constantly rotates at a target rotational speed corresponding to a control command from the controller 30, based on the measured value of the rotational speed (rotation rate) of the engine 11 input from the engine rotational speed sensor 11*a*. Then, the ECM 75 outputs such a drive command as to cause the engine 11 to generate a torque commensurate with the generated torque command to various actuators of the engine 11, such as a fuel injector.

The engine rotational speed sensor 11*a* is a known detector to detect the rotational speed of the engine 11. The engine rotational speed sensor 11*a* is connected to the ECM 75 in such a manner as to be able to communicate with the ECM 75 via a one-to-one communication line or an in-vehicle network such as a CAN. A detection signal commensurate with the rotational speed of the engine 11 is fed into the ECM 75.

The inclination sensor 40 is a known detector to detect the inclination angle of a work surface on which the shovel 500 is positioned. The inclination sensor 40 is, for example, mounted on the upper turning body 3, and detects the inclination angle of the shovel 500 (namely, the upper turning body 3) in the two axes of the front-rear direction and the right-left direction. The inclination sensor 40 is connected to the controller 30 in such a manner as to be able to communicate with the controller 30 via a one-to-one communication line or an in-vehicle network such as a CAN. A detection signal commensurate with the inclination angle is fed into the controller 30.

The controller 30 may determine whether a work surface is inclined based on information other than the detection signal of the inclination sensor 40. For example, the controller 30 may determine whether a work surface is inclined based on information on the state of extension of the boom cylinder 7, the arm cylinder 8, etc., at work that can be obtained by position sensors or the like provided on the boom cylinder 7, the arm cylinder 8, etc. This is because when the shovel 500 is positioned on sloping ground, the posture of the attachment at work can be different from that in the case of level ground. Furthermore, for example, the controller 30 may determine whether a work surface is inclined based on information on the state of movement of the attachment such as the boom 4 at work that can be obtained by an inertial sensor such as an IMU (Inertial Measurement Unit) provided on the attachment such as the boom 4. This is because when the shovel 500 is positioned on sloping ground, the state of movement of the attachment at work can be different from that in the case of level ground.

The boom angle sensor 42 is attached to the boom 4 and detects the angle of elevation of the boom 4 relative to the upper turning body 3, for example, an angle that the boom 4 forms relative to the turning plane of the upper turning body 3 (hereinafter referred to as "boom angle"). Examples of the boom angle sensor 42 include a rotary encoder, an acceleration sensor, an angular velocity sensor, a six-axis sensor, and an IMU. The same applies below to the arm angle sensor 44, the turning angle sensor 46, etc. The boom angle sensor 42 is connected to the controller 30 in such a manner as to be able to communicate with the controller 30 via a one-to-one communication line or an in-vehicle network such as a CAN. A detection signal commensurate with the boom angle is fed into the controller 30.

The arm angle sensor 44 is attached to the arm 5, and detects the angle of the arm 5 relative to the boom 4, namely, an angle that the arm 5 forms relative to the boom 4 (hereinafter referred to as "arm angle"). The arm angle sensor 44 is connected to the controller 30 in such a manner as to be able to communicate with the controller 30 via a one-to-one communication line or an in-vehicle network such as a CAN. A detection signal commensurate with the arm angle is fed into the controller 30.

The turning angle sensor 46 is attached to the upper turning body 3, and detects the turning angle of the upper turning body 3 relative to the reference angular position of the lower traveling body 1 (for example, an angular position corresponding to the forward movement direction of the lower traveling body 1). The turning angle sensor 46 is connected to the controller 30 in such a manner as to be able to communicate with the controller 30 via a one-to-one communication line or an in-vehicle network such as a CAN. A detection signal commensurate with the turning angle is fed into the controller 30.

The window open/closed state detecting part 47 detects the open/closed state of an openable and closable window provided in the cabin 10. The window open/closed state detecting part 47 is, for example, a contact switch provided where the window contacts a window frame (sash). The window open/closed state detecting part 47 is connected to the controller 30 in such a manner as to be able to communicate with the controller 30 via a one-to-one communication line or an in-vehicle network such as a CAN. A detection signal corresponding to the open/closed state of the window of the cabin 10 is fed into the controller 30.

The seat belt wearing state detecting part 48 detects the wearing state of a seat belt provided on the operator seat in the cabin 10. The seat belt wearing state detecting part 48 is, for example, a buckle switch provided in the buckle of a seat belt. The seat belt wearing state detecting part 48 is connected to the controller 30 in such a manner as to be able to communicate with the controller 30 via a one-to-one communication line or an in-vehicle network such as a CAN. A detection signal corresponding to the wearing state of a seat belt is fed into the controller 30.

A weight sensor 49 is a known detector to detect the weight of a load such as soil carried (loaded) in the bucket 6, and is connected to the controller 30 in such a manner as to be able to communicate with the controller 30 via a one-to-one communication line or an in-vehicle network such as a CAN.

The controller 30 may measure the load weight of the bucket 6 based on, for example, the posture of the attachment determined by the boom angle, the arm angle, etc., and the measured value of the pressure of hydraulic oil in the bottom-side oil chamber of the boom cylinder 7 (hereinafter, "boom bottom pressure") instead of the weight sensor 49.

The display device 50 is provided at such a location around the operator seat in the cabin 10 as to be easily viewed by the operator (for example, the right front pillar in the cabin 10), and displays various information images under the control of the controller 30. The display device 50 is, for example, a liquid crystal display or an organic EL (Electro Luminescence) display, and may be in the form of a touchscreen also serving as an operating part.

The audio output device 52 is provided around the operator seat in the cabin 10, and outputs audio for various kinds of notification to the operator under the control of the controller 30. Examples of the audio output device 52 include a loudspeaker and a buzzer.

The reducing valve 54 is provided in the hydraulic line 27 on the secondary side of the operating apparatus 26 in correspondence with each of the travel hydraulic motor 1A, the travel hydraulic motor 1B, the turning hydraulic motor 21, the boom cylinder 7, the arm cylinder 8, and the bucket cylinder 9, and reduces a pilot pressure corresponding to the operating state of the operating apparatus 26 in response to a control command from the controller 30. As a result, the operations of the lower traveling body 1, the upper turning body 3, the boom 4, the arm 5, and the bucket 6 can be individually and selectively restricted. The reducing valve 54 is, for example, an electromagnetic proportional valve that operates in response to a control signal from the controller 30.

The operations of the lower traveling body 1, etc., may be restricted by other than reducing a pilot pressure with the reducing valve 54. For example, the operations of the lower traveling body 1, etc., may be restricted by selectively releasing hydraulic oil supplied to the travel hydraulic motors 1A and 1B, the turning hydraulic motor 21, the boom cylinder 7, the arm cylinder 8, and the bucket cylinder 9 to a hydraulic oil tank with a variable pressure relief valve or the like. Furthermore, for example, the operations of the lower traveling body 1, etc., may be restricted by restricting the output of the main pump 14 that discharges hydraulic oil to the travel hydraulic motors 1A and 1B, etc., or the output of the engine 11 that drives the main pump 14.

[Details of Configuration of Attitude Stabilization Control Device]

Next, a configuration of an attitude stabilization control device 200 that performs the attitude stabilization control is described in detail with reference to FIG. 3.

Figure 3:
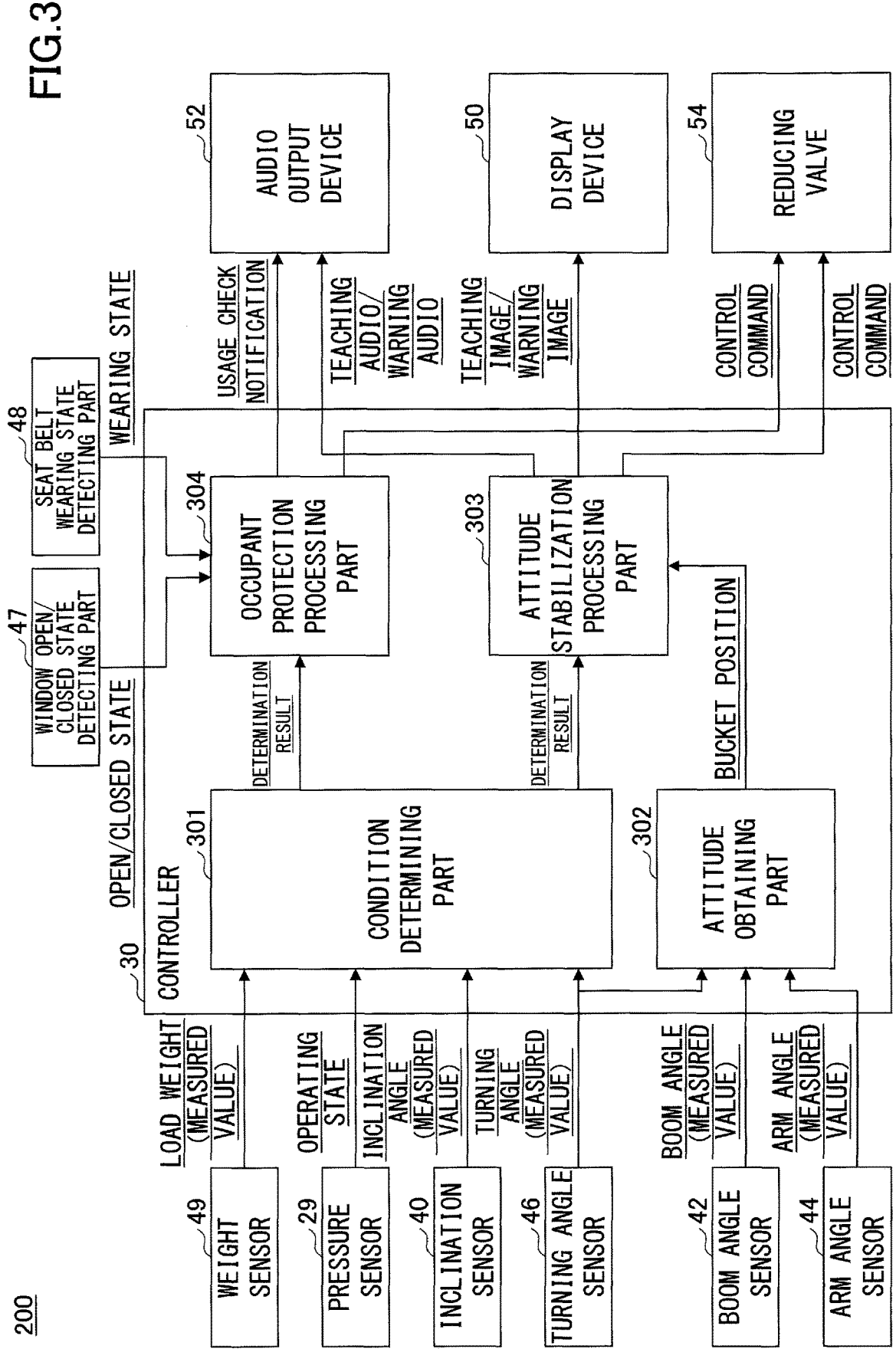
FIG. 3 is a functional block diagram illustrating an example configuration of an attitude stabilization control device.

FIG. 3 is a functional block diagram schematically illustrating an example functional configuration of the attitude stabilization control device 200.

The attitude stabilization control device 200 includes the controller 30, the pressure sensor 29, the inclination sensor 40, the boom angle sensor 42, the arm angle sensor 44, the turning angle sensor 46, the window open/closed state detecting part 47, the seat belt wearing state detecting part 48, the weight sensor 49, the display device 50, the audio output device 52, and the reducing valve 54.

The controller 30 includes a condition determining part 301, an attitude obtaining part 302, an attitude stabilization processing part 303, and an occupant protection processing part 304 as functional parts associated with the attitude stabilization control.

The condition determining part 301 determines whether the shovel 500 matches the condition for being subjected to the attitude stabilization control and the occupant protection control (hereinafter, "control application condition"), namely, whether the control application condition is satisfied. The control application condition includes at least a condition associated with a situation where the tipping of the shovel 500 in a downward direction on sloping ground may occur, namely, that "the shovel 500 is on sloping ground or is likely to enter sloping ground." For example, the condition determining part 301 may determine whether the shovel 500 is on sloping ground based on the detection signal of the inclination sensor 40. Furthermore, for example, the condition determining part 301 may identify the presence of sloping ground around the shovel 500 and the positional relationship between the shovel 500 and the sloping ground based on the topographic information of a work site recorded in advance in a non-volatile internal memory or the like. Furthermore, the condition determining part 301 may identify the presence of sloping ground around the shovel 500 and the positional relationship between the shovel 500 and the sloping ground based on information detected by a space recognition device that recognizes surrounding conditions mounted on the shovel 500. In this case, the space recognition device may include a monocular camera, a stereo camera, LIDAR (Light Detection and Ranging), and a millimeter wave radar. The condition determining part 301 can determine whether the shovel 500 is likely to enter sloping ground by determining whether the shovel 500 is traveling toward sloping ground based on the measured value of a pilot pressure commensurate with the state of movement of the lower traveling body 1. Furthermore, the condition determining part 301 may determine whether the shovel 500 is likely to enter sloping ground by recognizing the traveling state of the shovel 500 based on information detected by various sensors (for example, an IMU) mounted on the body (the lower traveling body 1 or the upper turning body 3) or the attachment. The control application condition is described in detail below.

The attitude obtaining part 302 obtains information on the attitude of the shovel 500 (hereinafter, "attitude information"). The attitude of the shovel 500 includes the orientation of the lower traveling body 1 (for example, the orientation of the lower traveling body 1 in the forward movement direction or the backward movement direction), the orientation of the attachment that changes according to the turning position of the upper turning body 3, and the posture state of the attachment (for example, posture angles such as the boom angle and the arm angle).

For example, as the attitude information, the attitude obtaining part 302 may obtain information on the position of the bucket 6 relative to the lower traveling body 1 (specifically, the position of a reference point in the bucket 6; hereinafter simply referred to as "bucket position") (bucket position information) based on the measured values of the boom angle, the arm angle, and the turning angle input from the boom angle sensor 42, the arm angle sensor 44, and the turning angle sensor 46, respectively. Specifically, the attitude obtaining part 302 obtains, as the bucket position information, a coordinate in a radial direction (a radial coordinate), a coordinate in a circumferential direction (an angular coordinate), and a coordinate in an axial direction (an axial coordinate) corresponding to the bucket position in a cylindrical coordinate system whose cylindrical central axis is the turning central axis of the upper turning body 3 and whose origin is the ground. In this case, the angular coordinate corresponds to the turning angle and the axial coordinate corresponds to the height of the bucket 6 from the ground.

Furthermore, for example, the attitude obtaining part 302 may obtain, as the attitude information, the relative relationship between the orientation of the lower traveling body 1 and the orientation of the attachment (for example, the angular difference between the orientation of the lower traveling body 1 and the orientation of the attachment). Specifically, the attitude obtaining part 302 obtains the relative relationship between the orientation of the lower traveling body 1 and the orientation of the attachment based on the measured value of the turning angle input from the turning angle sensor 46.

Furthermore, for example, the attitude obtaining part 302 may obtain, as the attitude information, the turning radius of the distal end of the attachment (namely, the distance between the distal end of the attachment and the turning axis of the upper turning body 3). Specifically, the attitude obtaining part 302 may obtain (calculate) the turning radius of the distal end of the attachment based on the measured values of the boom angle and the arm angle and the known link lengths of the boom 4 and the arm 5.

The attitude stabilization processing part 303 specifically performs the attitude stabilization control to encourage the operator to achieve the stable attitude of the shovel 500 that prevents the tipping of the shovel 500 in the downward direction of sloping ground when the control application condition is satisfied.

For example, the attitude stabilization processing part 303 (an example of a warning output part) outputs a warning about the operation of the shovel 500 by the operator or the like that calls attention to the tipping of the shovel 500 in the downward direction of sloping ground when the control application condition is satisfied (see FIG. 7A described below). That is, the attitude stabilization processing part 303 outputs the warning at least when the shovel 500 is on sloping ground or is likely to enter sloping ground. In this case, the attitude stabilization processing part 303 may output a warning about an operation that affects the tipping of the shovel 500 in a downward direction on sloping ground, for example, the operation of at least one of the lower traveling body 1, the upper turning body 3, and the attachment. This is because the shovel 500 may tip in a downward direction in response to the operation of the lower traveling body 1, the upper turning body 3, or the attachment. Hereinafter, this processing operation is referred to as "warning outputting process". Specifically, the attitude stabilization processing part 303 may output a warning to the operator via the display device 50 or the audio output device 52. More specifically, the attitude stabilization processing part 303 may display a warning image including text information or the like that calls attention to tipping in the downward direction of sloping ground on the display device 50. Furthermore, the attitude stabilization processing part 303 may output audio that calls attention to tipping in the downward direction of sloping ground through the audio output device 52. This makes it possible to alert the operator to the tipping of the shovel 500 in a downward direction when the shovel 500 travels downward on sloping ground.

Furthermore, in the case where the shovel 500 is on sloping ground or is likely to enter sloping ground (see FIG. 7B described below), the attitude stabilization processing part 303 may output a warning that the attitude of the shovel 500 is unstable when the shovel 500 is in an unstable attitude state that furthers the tipping of the shovel 500 in the downward direction of sloping ground (hereinafter simply "unstable attitude"). That is, in the case where the control application condition is satisfied, the attitude stabilization processing part 303 may output a warning when the condition that the shovel 500 is in an unstable attitude (hereinafter "unstable attitude condition") is further satisfied. More specifically, the attitude stabilization processing part 303 may display a warning image including text information to the effect that the attitude is unstable on the display device 50. Furthermore, the attitude stabilization processing part 303 may output audio to the effect that the current attitude of the shovel 500 corresponds to the unstable attitude through the audio output device 52. This enables the operator to be aware that the current attitude of the shovel 500 is the unstable attitude that may cause tipping in the downward direction of sloping ground. Therefore, it is possible to encourage the operator to operate the lower traveling body 1, the upper turning body 3, the attachment, etc., such that the shovel 500 in an unstable attitude achieves a stable attitude. Furthermore, a warning that calls attention to the tipping of the shovel 500 in a downward direction (specifically, a warning that the attitude is unstable) is output only when the shovel 500 is in an unstable attitude. Therefore, the controller 30 can prevent the operator from being bothered by the outputting of a warning in a situation where the shovel 500 is not in an unstable attitude and is unlikely to tip.

The unstable attitude of the shovel 500 is described with reference to FIG. 4.

Figure 4:
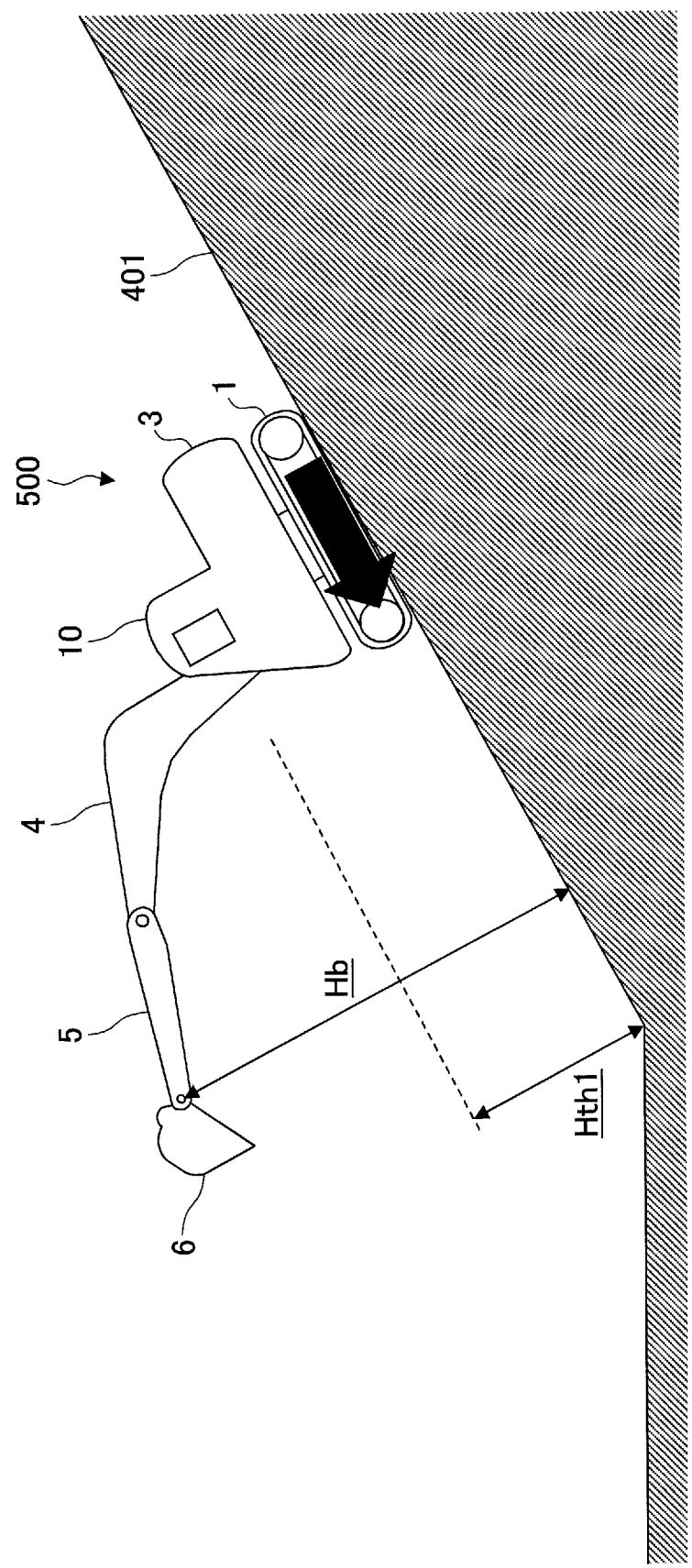
FIG. 4 is a diagram illustrating a specific example of the unstable attitude of the shovel.

FIG. 4 is a diagram illustrating a specific example of the unstable attitude of the shovel 500.

As illustrated in FIG. 4, according to this example, the shovel 500 is traveling on sloping ground 401 in a downward direction on the lower traveling body 1, with the orientation of the attachment matching the travel direction of the lower traveling body 1 and the bucket 6 being raised to a relatively high position. The bucket 6 is at a position relatively distant from the ground, specifically, at a position more distant from the ground than is the height position of the cabin 10. Therefore, if the shovel 500 starts to tip in the downward direction of the sloping ground 401, the bucket 6 cannot immediately touch the ground. Therefore, the shovel 500 is likely to actually tip because the attachment cannot serve as a prop to prevent tipping. That is, the unstable attitude of the shovel 500 may correspond to a state where the attachment is oriented in the downward direction of sloping ground and a height Hb of the bucket 6 from the ground (the height of the juncture of the bucket 6 with the arm 5 from the ground according to this example) is relatively large, namely, more than a predetermined threshold Hth1.

The threshold Hth1 may be determined with reference to the height dimension of the cabin 10 in view of the necessity of protecting the cabin 10 in case the shovel 500 starts to tip and the bucket 6 touches the ground. For example, the threshold Hth1 is set to less than or equal to the height of the cabin 10.

The attitude stabilization processing part 303 can determine whether the height Hb of the bucket 6 from the ground is more than the threshold Hth1 and determine whether the shovel 500 is in an unstable attitude, based on axial coordinates corresponding to the bucket position obtained by the attitude obtaining part 302.

Furthermore, the unstable attitude of the shovel 500 may be determined by a match between the orientation of the attachment and the travel direction of the lower traveling body 1. This is because the travel direction of the lower traveling body 1 in the case of traveling downward on the sloping ground 401 corresponds to the direction of possible tipping of the shovel 500 and the bucket 6 is less likely to touch the ground if there is a mismatch between the orientation of the attachment and the travel direction of the lower traveling body 1. For example, the unstable attitude of the shovel 500 may correspond to a state where the attachment is oriented in the downward direction of sloping ground and an angular difference $\Delta\theta$ that is a difference between the orientation of the attachment and the travel direction of the lower traveling body 1 is relatively large, namely, the attitude state (turning state) of the upper turning body 3 that exceeds a predetermined threshold $\theta th1$.

The threshold $\theta th1$ is determined such that the bucket 6 is within the widthwise position range of the lower traveling body 1 touching the ground in the plan view, for example. That is, the threshold $\theta th1$ may be determined with reference to the widthwise positional relationship between the bucket 6 and the lower traveling body 1 in the plan view. In this case, the threshold $\theta th1$ changes according to the position of the bucket 6 in the front-rear direction (travel direction) of the lower traveling body 1.

The attitude stabilization processing part 303 can determine whether the angular difference $\Delta\theta$ is more than or equal to the threshold $\theta th1$ and determine whether the shovel 500 is in an unstable attitude, based on angular coordinates corresponding to the bucket position obtained by the attitude obtaining part 302.

When the shovel 500 (the lower traveling body 1) travels on sloping ground in a downward direction, normally, it is often the case that the operator determines the turning position of the upper turning body 3 with the operating apparatus 26 so that the operator can look in the downward direction that is the travel direction. That is, when the shovel 500 travels on sloping ground in a downward direction, it is often the case that the upper turning body 3 is at such a turning position that the orientation of the attachment substantially matches the travel direction of the lower traveling body 1. Therefore, the attitude stabilization processing part 303 may omit a determination as to the difference between the travel direction of the lower traveling body 1 and the orientation of the attachment and may determine whether the shovel 500 is in an unstable attitude by a determination as to the bucket position alone.

Furthermore, the unstable attitude of the shovel 500 may correspond to a state where the attachment is oriented in the downward direction of sloping ground and the turning radius R of the distal end of the attachment (for example, a tooth tip of the bucket 6) is more than a predetermined threshold Rth. This is because when the distal end of the attachment is distant from the upper turning body 3 with the attachment oriented in the downward direction, variations in the moment of inertia due to the movement of the attachment increase, so that the shovel 500 is more likely to tip in the downward direction.

In this case, the threshold Rth may be predetermined as a fixed value based on experiments, simulations or the like in view of the weight of a load (load weight), such as soil loaded in the bucket 6 or a load suspended from a hook that is not depicted, at the distal end of the attachment. Furthermore, the threshold Rth may be changed in accordance with a load weight at the distal end of the attachment (the weight of a load contained in the bucket 6) corresponding to the detection signal of the weight sensor 49.

Furthermore, the unstable attitude of the shovel 500 may correspond to a state where the attachment is oriented in the downward direction of sloping ground and a load weight W at the distal end of the attachment corresponding to the detection signal of the weight sensor 49 is more than a predetermined threshold Wth. This is because when a load weight at the distal end of the attachment is relatively large with the attachment oriented in the downward direction, variations in the moment of inertia due to the movement of the attachment increase, so that the shovel 500 is more likely to tip in the downward direction.

Referring back to FIG. 3, in the case where the shovel 500 is on sloping ground or is likely to enter sloping ground, the attitude stabilization processing part 303 may output a warning that the shovel 500 is making an unstable movement when the shovel 500 is in an unstable state of movement that furthers the tipping of the shovel 500 in the downward direction of sloping ground (hereinafter simply "unstable movement"). That is, in the case where the control application condition is satisfied, the attitude stabilization processing part 303 may output a warning when the condition that the shovel 500 is making an unstable movement that furthers the tipping of the shovel 500 in the downward direction of sloping ground (hereinafter "unstable movement condition") is further satisfied. More specifically, the attitude stabilization processing part 303 may display a warning image including text information to the effect that an unstable movement is being made on the display device 50. Furthermore, the attitude stabilization processing part 303 may output audio to the effect that the current state of movement of the shovel 500 corresponds to the unstable movement through the audio output device 52. This enables the operator to be aware that the current state of movement of the shovel 500 corresponds to the unstable movement that may cause tipping in the downward direction of sloping ground. Therefore, the controller 30 can encourage the operator to operate the lower traveling body 1, the upper turning body 3, the attachment, etc., such that the shovel 500 making an unstable movement achieves a stable attitude state or state of movement. Furthermore, a warning that calls attention to the tipping of the shovel 500 in the downward direction (specifically, a warning that an unstable movement is being made) is output only when the shovel 500 is making an unstable movement. Therefore, the controller 30 can prevent the operator from being bothered by the outputting of a warning in a situation where the shovel 500 is not making an unstable movement and is unlikely to tip.

The unstable movement of the shovel 500 is, for example, a state of movement that brings the attitude state of the shovel 500 to an unstable attitude.

Specifically, the unstable movement of the shovel 500 may correspond to the state of movement of the attachment that moves the bucket 6 away from the ground (for example, raising the boom 4 or opening the arm 5) with the attachment oriented in the downward direction. Furthermore, the unstable movement of the shovel 500 may correspond to the state of movement of at least one of the lower traveling body 1 and the upper turning body 3 that orients the attachment in a downward direction along the direction of inclination of sloping ground (hereinafter "downslope direction" for convenience) with the height Hb of the bucket 6 from the ground being relatively high (Hb>Hth1). In this case, the state of movement that orients the attachment in the downslope direction includes the turning motion of the upper turning body 3 and the turning motion (direction changing motion) of the lower traveling body 1 that orient the attachment in the downslope direction.

Furthermore, the unstable movement of the shovel 500 may correspond to the state of movement of the attachment that moves the position of the distal end of the attachment in a direction to increase the turning radius R with the attachment oriented in the downward direction. Furthermore, the unstable movement of the shovel 500 may correspond to the state of movement of at least one of the lower traveling body 1 and the upper turning body 3 that orients the attachment in the downslope direction with the turning radius R of the distal end of the attachment exceeding the threshold Rth.

Furthermore, the unstable movement of the shovel 500 may correspond to the state of movement of at least one of the lower traveling body 1, the upper turning body 3, and the attachment that may increase the overturning moment of the shovel 500 in the downward direction. For example, the unstable movement of the shovel 500 may correspond to the state of movement of the attachment where a physical quantity associated with the movement speed of the attachment (for example, the angular velocity, angular acceleration or the like of the boom 4 or the arm 5) is relatively high (namely, exceeding a predetermined threshold) with the attachment oriented in the downward direction. In this case, the measured value of the physical quantity associated with the movement speed of the attachment may be obtained (calculated) based on the detection signal of the boom angle sensor 42 or the arm angle sensor 44 or a detection signal (pressure signal) corresponding to the boom 4 or the arm 5 in the pressure sensor 29. Furthermore, the unstable movement of the shovel 500 may correspond to the state of movement that orients the attachment in the downward direction and where a physical quantity associated with the movement speed of the attachment (for example, the travel speed, travel acceleration or the like of the lower traveling body 1 or the turning speed, turning acceleration or the like of the upper turning body 3) is relatively high (namely, exceeding a predetermined threshold). In this case, the measured value of the physical quantity associated with the movement speed of the lower traveling body 1 or the upper turning body 3 may be obtained (calculated) based on the detection signal of the turning angle sensor 46 or a detections signal (pressure signal) corresponding to the lower traveling body 1 or the upper turning body 3 in the pressure sensor 29.

Furthermore, for example, the attitude stabilization processing part 303 (an example of a first movement restricting part) restricts the movement of a motion element of the shovel 500 when the control application condition is satisfied (see FIG. 8A described below). That is, the attitude stabilization processing part 303 restricts the movement of a motion element of the shovel 500 at least when the shovel 500 is on sloping ground or is likely to enter sloping ground. Hereinafter, this processing operation is referred to as "first movement restricting process". In this case, the attitude stabilization processing part 303 may restrict the movements of all of the lower traveling body 1, the upper turning body 3, and the attachment or may restrict the movement of one or some motion elements (for example, only motion elements determined to be relatively highly influential on tipping). Specifically, the attitude stabilization processing part 303 outputs a control command to the reducing valve 54 to cause a movement to be slower than normally is, the movement corresponding to the operation of at least one of the travel hydraulic motors 1A and 1B that drive the lower traveling body 1, the turning hydraulic motor 21 that drives the upper turning body 3, and the boom cylinder 7, the arm cylinder 8, and the bucket cylinder 9 that drive the attachment in the operating apparatus 26. As a result, a sudden movement, the travel speed, etc., of at least one of the lower traveling body 1, the upper turning body 3, and the attachment on sloping ground are controlled, so that it is possible to prevent the tipping of the shovel 500 in the downward direction.

Furthermore, in the case where the shovel 500 is on sloping ground or is likely to enter sloping ground, the attitude stabilization processing part 303 may restrict the movement of a motion element of the shovel 500 when the shovel 500 is in an unstable attitude. That is, in the case where the control application condition is satisfied, the attitude stabilization processing part 303 may restrict the movement of a motion element of the shovel 500 when the unstable attitude condition is further satisfied. Furthermore, in the case where the shovel 500 is on sloping ground or is likely to enter sloping ground, the attitude stabilization processing part 303 may restrict the movement of a motion element of the shovel 500 when the shovel 500 is making an unstable movement. That is, in the case where the control application condition is satisfied, the attitude stabilization processing part 303 may restrict the movement of a motion element of the shovel 500 when the unstable attitude condition or the unstable movement condition is further satisfied. According to this, while preventing the tipping of the shovel 500 that is in an unstable attitude or is making an unstable movement, it is possible to control the feeling of strangeness of the operator or reduction in the work efficiency of the operator due to restriction of the movement of the lower traveling body 1, etc., of the shovel 500 that is not in an unstable attitude or the shovel 500 that is not making an unstable movement, namely, the shovel 500 in an attitude state or a state of movement that is less likely to cause tipping.

Furthermore, the attitude stabilization processing part 303 may restrict the movement of a motion element of the shovel 500 when the shovel 500 remains in an unstable attitude even after the output of the above-described warning in a situation where the shovel 500 remains on sloping ground or remains likely to enter sloping ground (see FIG. 8B described below). Furthermore, the attitude stabilization processing part 303 may restrict the movement of a motion element of the shovel 500 when the shovel 500 continues an unstable movement even after the output of the above-described warning in a situation where the shovel 500 remains on sloping ground or remains likely to enter sloping ground. That is, in the case where the control application condition is satisfied, the attitude stabilization processing part 303 may restrict the movement of a motion element of the shovel 500 when the condition that the shovel 500 remains in an unstable attitude even after the output of the warning (hereinafter "continued unstable attitude condition") or the condition that the shovel 500 continues an unstable movement even after the output of the warning (hereinafter "continued unstable movement condition") is further satisfied. According to this, it is possible to restrict the movement of the lower traveling body 1, etc., only when the shovel 500 is still in an unstable attitude after a warning that calls attention to the tipping of the shovel 500. Therefore, while preventing the tipping of the shovel 500, it is possible to further control the feeling of strangeness of the operator or reduction in the work efficiency of the operator due to restriction of the movement of the lower traveling body 1, etc.

Furthermore, for example, the attitude stabilization processing part 303 (an example of a teaching part) teaches the operator the stable attitude of the shovel 500 when the control application condition is satisfied (see FIG. 9 described below). That is, the attitude stabilization processing part 303 teaches the operator the stable attitude of the shovel 500 at least when the shovel 500 is on sloping ground or is likely to enter sloping ground. Hereinafter, this processing operation is referred to as "stable attitude teaching process". Specifically, the attitude stabilization processing part 303 displays an image imitating the shovel 500 that corresponds to a stable attitude, text information that encourages operations for a stable attitude, etc., on the display device 50 and outputs audio that encourages operations for a stable attitude from the audio output device 52. This enables the operator to operate the upper turning body 3, the attachment, etc., of the shovel 500 using the operating apparatus 26 such that the attitude or posture of the upper turning body 3 and the attachment approaches the taught stable attitude. Therefore, it is possible to prevent the tipping of the shovel 500 when the shovel 500 is traveling in the downward direction.

Furthermore, in the case where the shovel 500 is on sloping ground or is likely to enter sloping ground, the attitude stabilization processing part 303 may teach the operator the stable attitude of the shovel 500 when the shovel 500 is in an unstable attitude. Furthermore, in the case where the shovel 500 is on sloping ground or is likely to enter sloping ground, the attitude stabilization processing part 303 may teach the operator the stable attitude of the shovel 500 when the shovel 500 is making an unstable movement. That is, in the case where the control application condition is satisfied, the attitude stabilization processing part 303 may teach the operator the stable attitude of the shovel 500 when the unstable attitude condition or the unstable movement condition is further satisfied. According to this, while encouraging the operator to operate the lower traveling body 1, the upper turning body 3, the attachment, etc., in such a manner as to approach the shovel 500 in an unstable attitude or the shovel 500 that is making an unstable movement to a stable attitude, it is possible to prevent the operator of the shovel 500 that is already in a stable attitude from being unnecessarily taught a stable attitude.

A specific example of the stable attitude of the shovel 500 and a specific example of a method of teaching a stable attitude are described below with reference to FIGS. 5 and 6.

Figure 5:
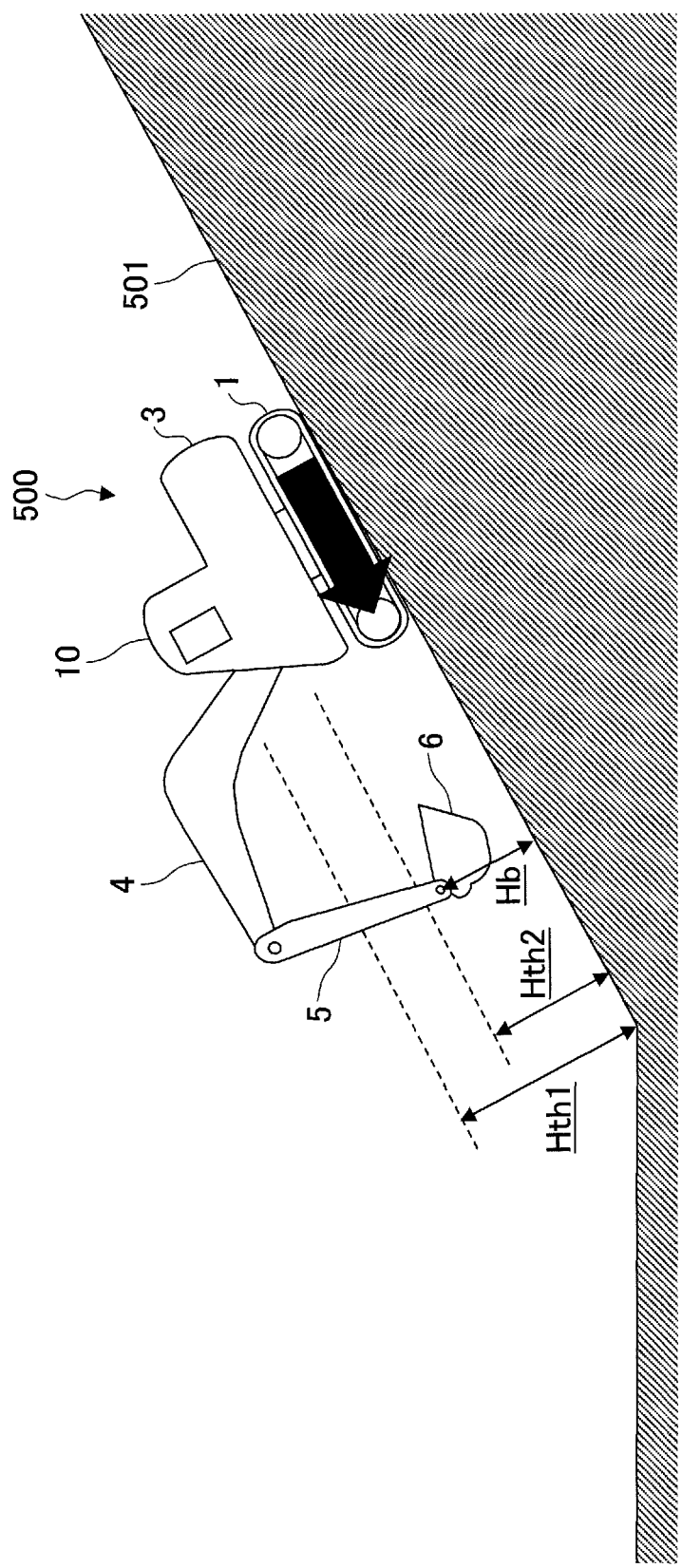
FIG. 5 is a diagram illustrating a specific example of the stable attitude of the shovel.

FIG. 5 is a diagram illustrating a specific example of the stable attitude of the shovel 500.

As illustrated in FIG. 5, according to this example, the shovel 500 is traveling on sloping ground 501 in a downward direction on the lower traveling body 1. In this situation, if the orientation of the attachment substantially matches the travel direction of the lower traveling body 1 and the bucket 6 is positioned relatively close to the ground, the bucket 6 immediately touches the ground even when the shovel 500 almost tips over in the downward direction of the sloping ground 501. The whole attachment including the bucket 6 serves as a prop, so that the shovel 500 can avoid tipping.

That is, the stable attitude of the shovel 500 includes a state where the difference between the orientation of the attachment and the travel direction of the lower traveling body 1 is relatively small, namely, the attitude state (turning state) of the upper turning body 3 where the difference (angular difference $\Delta\theta$) between the orientation of the attachment and the travel direction of the lower traveling body 1 is less than or equal to a predetermined threshold $\theta th2$ (an example of a second threshold), which is set to less than or equal to the threshold $\theta th1$.

Like the threshold $\theta th1$, the threshold $\theta th2$ may be determined with reference to the widthwise positional relationship between the bucket 6 and the lower traveling body 1 in the plan view. Specifically, the threshold $\theta th2$ may be determined such that the bucket 6 is within the widthwise position range of the lower traveling body 1 touching the ground in the plan view.

Furthermore, the stable attitude of the shovel 500 includes the posture state of the attachment where the height of the bucket 6 from the ground (according to this example, the same as in the case of FIG. 4, the height of the juncture of the bucket 6 with the arm 5 from the ground) Hb is relatively small, namely, less than or equal to a threshold Hth2 (an example of a first threshold) that is set to less than or equal to the threshold Hth1.

Like the threshold Hth1, the threshold Hth2 may be determined with reference to the height dimension of the cabin 10. For example, the threshold Hth2 may be set to less than or equal to the height of the cabin 10.

Thus, the attitude stabilization processing part 303 may teach the operator, as a stable attitude, the attitude of the shovel 500 corresponding to a state where the difference between the orientation of the attachment and the travel direction of the lower traveling body 1 is relatively small and the bucket position is relatively close to the ground. Specifically, the attitude stabilization processing part 303 may encourage the operator to operate the upper turning body 3 with the operating apparatus 26 such that the orientation of the attachment approaches (matches) the travel direction of the lower traveling body 1. Furthermore, the attitude stabilization processing part 303 may encourage the operator to operate the attachment (the boom 4, the arm 5, and the bucket 6) with the operating apparatus 26 such that the bucket 6 relatively approaches the ground. According to this, the stable attitude of the shovel 500 can be achieved according as the operator operates the upper turning body 3 and the attachment. Therefore, it is possible to prevent the tipping of the shovel 500 in a downward direction on sloping ground.

In the case where the shovel 500 travels on sloping ground in a downward direction as in this example, the upper turning body 3 is often at a turning position that substantially matches the travel direction of the lower traveling body 1. Therefore, the attitude stabilization processing part 303 may omit teachings about the difference between the travel direction of the lower traveling body 1 and the orientation of the attachment and provide teachings on the bucket position (the height of the bucket 6 from the ground) alone. Furthermore, the attitude stabilization processing part 303 may teach the operator, as a stable attitude, the attitude of the shovel 500 in which the turning radius of the distal end of the attachment is relatively small. Furthermore, the attitude stabilization processing part 303 may teach the operator, instead of or in addition to a stable attitude, the state of movement of the shovel 500 that prevents the tipping of the shovel 500 (hereinafter "stable movement of the shovel 500") through the display device 50 or the audio output device 52. In this case, the stable movement of the shovel 500 may include a state of movement that brings the attitude state of the shovel 500 to a stable attitude. Furthermore, the stable movement of the shovel 500 may correspond to the state of movement of at least one of the lower traveling body 1, the upper turning body 3, and the attachment that relatively reduces the tipping moment of the shovel 500 in the downward direction. That is, the stable movement of the shovel 500 may correspond to a state of movement where a physical quantity associated with the movement speed of the lower traveling body 1, the upper turning body 3, or the attachment is relatively small.

Figure 6:
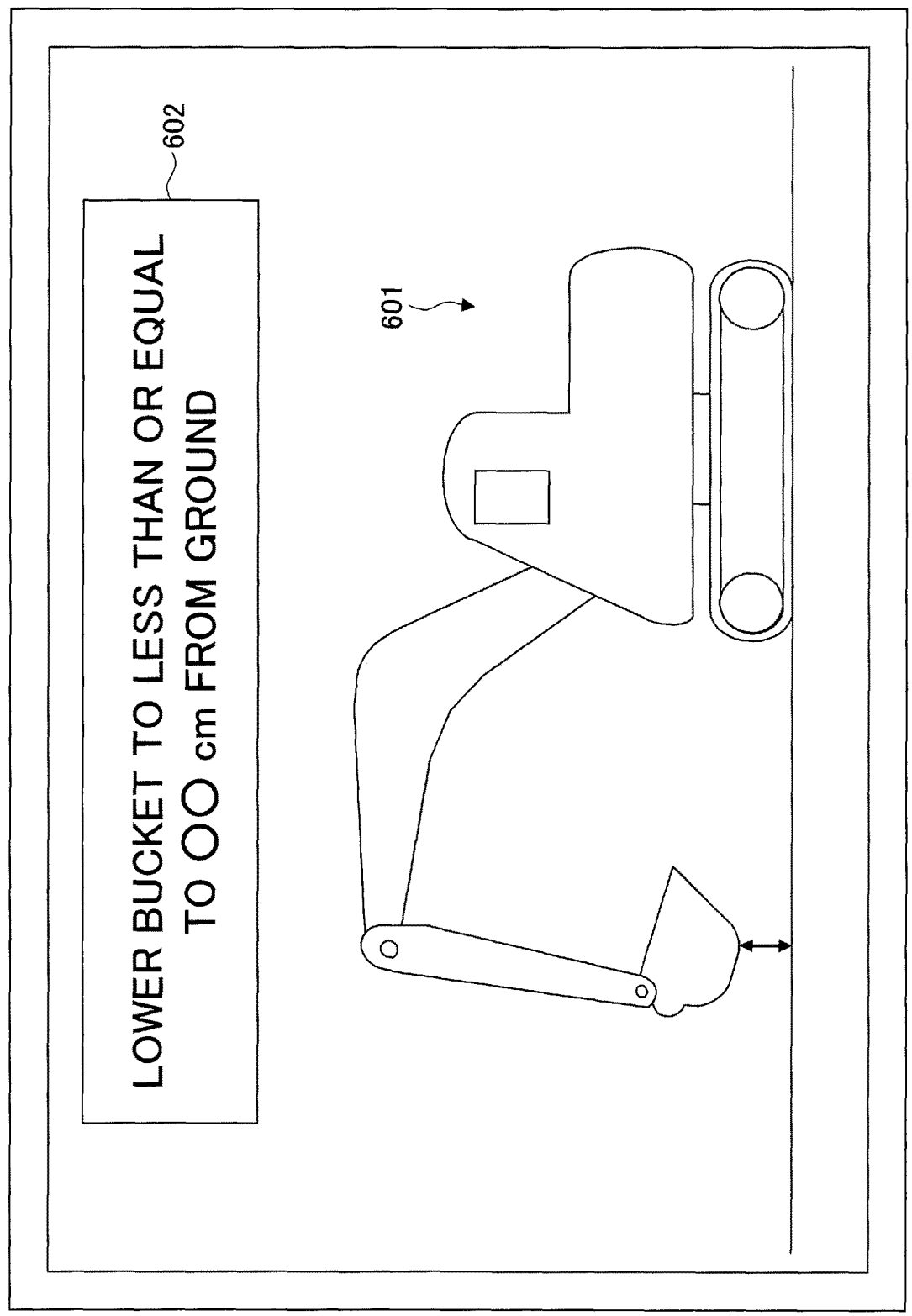
FIG. 6 is a diagram illustrating an example of a method of teaching a stable attitude.

Next, FIG. 6 is a diagram illustrating an example of the method of teaching a stable attitude. Specifically, FIG. 6 is a diagram illustrating an example of an image that teaches the operator the stable attitude of the shovel 500 (teaching image) displayed on the display device 50.

As illustrated in FIG. 6, according to this example, a teaching image that the attitude stabilization processing part 303 displays on the display device 50 includes a shovel image 601 imitating the shovel 500 corresponding to a stable attitude and a text image 602 including text information that encourages the operator to operate the attachment.

The shovel image 601 imitates the stable attitude of the shovel 500 in which the bucket 6 is at a position relatively close to the ground. This enables the operator to intuitively understand a stable attitude and to easily achieve the stable attitude of the shovel 500 by operating the operating apparatus 26.

Furthermore, the text image 602 shows text information that encourages the operator to so operate the attachment as to lower the bucket 6 to less than or equal to a height ("oo cm") corresponding to the above-described threshold Hth2. This enables the operator to easily understand what specific operations to perform and therefore to more easily achieve the stable attitude of the shovel 500 by operating the operating apparatus 26.

As a matter of course, the attitude stabilization processing part 303 may display a teaching image for reducing the difference between the orientation of the attachment and the travel direction of the lower traveling body 1 on the display device 50. In this case, for example, the teaching image may show a shovel image imitating the shovel 500 as seen in a plan view which indicates the turning state of the upper turning body 3, in addition to or instead of the shovel image 601. Furthermore, for example, the teaching image may show text information that encourages the operator to operate the upper turning body 3 such that the orientation of the attachment approaches (matches) the travel direction of the lower traveling body 1, in addition to or instead of the text image 602. Furthermore, the attitude stabilization processing part 303 may output audio corresponding to text information such as the text image 602 through the audio output device 52 as described above.

Referring back to FIG. 3, for example, when the control application condition is satisfied, the attitude stabilization processing part 303 notifies the operator how much is the extent of deviation of the current attitude state of the shovel 500 from a stable attitude through the display device 50 or the audio output device 52. That is, the attitude stabilization processing part 303 notifies the operator of the extent of deviation of the current attitude state of the shovel 500 from a stable attitude at least when the shovel 500 is on sloping ground or is likely to enter sloping ground. Hereinafter, this process is referred to as "stable attitude deviation extent notification process." Furthermore, in the case where the control application condition is satisfied, the attitude stabilization processing part 303 may report the extent of deviation from a stable attitude when the condition that the current attitude state of the shovel 500 does not correspond to a stable attitude (hereinafter "stable attitude non-correspondence condition") is further satisfied. Specifically, the attitude stabilization processing part 303 may notify the operator of the difference between the height Hb of the bucket 6 from the ground and the threshold Hth2. Furthermore, the attitude stabilization processing part 303 may notify the operator of the difference (angular difference $\Delta\theta$) between the orientation of the attachment and the travel direction of the lower traveling body 1. Furthermore, the attitude stabilization processing part 303 may notify the operator of the difference between the turning radius R corresponding to the current position of the distal end of the attachment and the threshold Rth. This enables the operator to understand the extent of deviation of the current attitude of the shovel 500 from a stable attitude. Therefore, the operator can bring the upper turning body 3 and the attachment into an attitude state corresponding to a stable attitude more easily by operating the operating apparatus 26 using the reported extent of deviation as a guide.

Instead of or in addition to the extent of deviation of the shovel 500 from a stable attitude, the attitude stabilization processing part 303 may notify the operator or the like of the extent of deviation of the state of movement of the shovel 500 from a stable movement through the display device 50, the audio output device 52 or the like. Furthermore, with respect to the above-described warning outputting process, first movement restricting process, stable attitude teaching process, and stable attitude deviation extent notification process, either all or only one or some of them may be executed. Furthermore, the warning outputting process, the first movement restricting process, the stable attitude teaching process, and the stable attitude deviation extent notification process may be executed independently or may be executed such that one process depends on another process. Specifically, the warning outputting process, the first movement restricting process, the stable attitude teaching process, and the stable attitude deviation extent notification process may be simultaneously executable. Furthermore, the warning outputting process, the first movement restricting process, the stable attitude teaching process, and the stable attitude deviation extent notification process may be dependently executable such that, for example, the first movement restricting process, the stable attitude teaching process, and the stable attitude deviation extent notification process may be executed after the output of a warning by the warning outputting process.

The occupant protection processing part 304 specifically performs occupant protection control when the application control condition is satisfied.

For example, the occupant protection processing part 304 executes a process to encourage the operator to use safety equipment that protects the operator in the case of the tilting or the like of the shovel 500. Hereinafter, this processing operation is referred to as "usage check notification process." Examples of safety equipment include the seat belt of the operator seat and the window of the cabin 10 that prevent the operator from being thrown out of the cabin 10 in case the shovel 500 should tip.

Specifically, the occupant protection processing part 304 (an example of a notification output part) may make a notification (usage check notification) to encourage the operator to use the safety equipment through the audio output device 52. That is, the occupant protection processing part 304 may output an audio notification to encourage the operator to wear the seat belt through the audio output device 52 and output an audio notification to encourage the operator to close the window through the audio output device 52.

More specifically, the occupant protection processing part 304 makes a usage check notification when the shovel 500 starts to work, such as when the shovel 500 is activated or when a gate lock lever is pulled up. Based on this, the occupant protection processing part 304 makes a usage check notification when the control application condition is satisfied, namely, at least when the shovel 500 is on sloping ground or is likely to enter sloping ground (see FIG. 10A described below). As a result, it is possible to encourage the operator to use the safety equipment, and even if the shovel 500 tips over, the usage of the safety equipment makes it possible to prevent the operator from being thrown out of the cabin 10.

Furthermore, in the case where the shovel 500 is on sloping ground or is likely to enter sloping ground, the occupant protection processing part 304 may make a usage check notification when the safety equipment is not used (see FIG. 10B described below). That is, in the case where the control application condition is satisfied, the occupant protection processing part 304 may make a usage check notification when the condition that the safety equipment is not used (hereinafter "safety equipment non-usage condition") is further satisfied. According to this, no usage check notification is made when the safety equipment is used. Therefore, it is possible to prevent an unnecessary usage check notification and to prevent the operator from being bothered by an unnecessary usage check notification. Specifically, in the case where the shovel 500 is on sloping ground or is likely to enter sloping ground, the occupant protection processing part 304 may make a usage check notification when the window of the cabin 10 is open. Furthermore, in the case where the shovel 500 is on sloping ground or is likely to enter sloping ground, the occupant protection processing part 304 may make a usage check notification when the seat belt is not worn. Furthermore, when only one of the condition that the window of the cabin 10 is open and the condition that the seat belt is not worn is satisfied, the occupant protection processing part 304 may make a usage check notification corresponding only to the satisfied condition (such as a notification to only encourage the operator to close the window or a notification to only encourage the operator to wear the seat belt).

The usage check notification may be made through the display device 50. In this case, an image corresponding to the usage check notification may be displayed over the teaching image on the display device 50.

Furthermore, for example, at least in the case where the shovel 500 is on sloping ground or is likely to enter sloping ground, the occupant protection processing part 304 (an example of a second movement restricting part) restricts the movement of a motion element of the shovel 500 when the safety equipment is not used (see FIG. 11A described below). Hereinafter, this processing is referred to as "second movement restricting process." That is, in the case where the control application condition is satisfied, the occupant protection processing part 304 restricts the movement of a motion element of the shovel 500 when the safety equipment non-usage condition is further satisfied. In this case, the same as in the case of the first movement restricting process by the attitude stabilization processing part 303, the occupant protection processing part 304 may restrict the movements of all of the lower traveling body 1, the upper turning body 3, and the attachment or may restrict the movement of one or some motion elements (for example, only motion elements determined to be relatively highly influential on tipping). Specifically, the same as in the case of the first movement restricting process by the attitude stabilization processing part 303, the occupant protection processing part 304 outputs a control command to the reducing valve 54 to cause a movement to be slower than normally is or to stop, the movement corresponding to the operation of at least one of the travel hydraulic motors 1A and 1B that drive the lower traveling body 1, the turning hydraulic motor 21 that drives the upper turning body 3, and the boom cylinder 7, the arm cylinder 8, and the bucket cylinder 9 that drive the attachment in the operating apparatus 26. As a result, a sudden movement, the travel speed, etc., of at least one of the lower traveling body 1, the upper turning body 3, and the attachment on sloping ground are controlled, so that it is possible to prevent the tipping of the shovel 500 in the downward direction and to ensure the safety of the operator who is not using the safety equipment.

Furthermore, in a situation where at least the shovel 500 remains on sloping ground or remains likely to enter sloping ground, the occupant protection processing part 304 may restrict the movement of a motion element of the shovel 500 when the safety equipment remains unused even after a usage check notification (see FIG. 11B described below). That is, in the case where the control application condition is satisfied, the occupant protection processing part 304 may restrict the movement of a motion element of the shovel 500 when the condition that the safety equipment remains unused even after a usage check notification (hereinafter "continued safety equipment non-usage condition") is further satisfied. According to this, while encouraging the operator to use the safety equipment through a usage check notification, it is possible to restrict the movement of the lower traveling body 1 only when the safety equipment nonetheless remains unused. Therefore, it is possible to control the feeling of strangeness of the operator or reduction in the work efficiency of the operator due to restriction of the movement of the lower traveling body 1 while ensuring the safety of the operator who is not using the safety equipment.

With respect to the above-described usage check notification process and the second movement restricting process, both of them may be executed or only the usage check notification process may be executed.

[Details of Operation of First Example of Attitude Stabilization Control Device]

Next, a specific operation of a first example of the attitude stabilization control device 200 according to this embodiment is described with reference to FIGS. 7A through 11B.

According to this example, the controller 30 performs the attitude stabilization control and the occupant protection control when the shovel 500 travels on sloping ground in a downward direction on the lower traveling body 1. That is, according to this example, the control application condition is that "the lower traveling body 1 is traveling on sloping ground in a downward direction", and the condition determining part 301 determines whether the lower traveling body 1 is traveling on sloping ground in a downward direction. This is because when the lower traveling body 1 is traveling downslope, the shovel 500 is more likely to tip in the downward direction depending on the state of travel (for example, speed, acceleration, etc.) of the lower traveling body 1 and the attitude state of the upper turning body 3 and the attachment. Hereinafter, the term "downward direction" includes not only a downslope direction but also a direction to move down sloping ground diagonally relative to the direction of inclination of a slope.

Specifically, the condition determining part 301 may determine whether the lower traveling body 1 is traveling on sloping ground in a downward direction based on the measured values of a pilot pressure commensurate with the operating state of the lower traveling body 1, an inclination angle, and a turning angle, which are input from the pressure sensor 29, the inclination sensor 40, and the turning angle sensor 46, respectively. More specifically, the condition determining part 301 may determine whether the shovel 500 is on sloping ground by calculating the inclination angle Θ of a work surface based on the measured value of the inclination angle of the work surface in two axes with reference to the upper turning body 3. Furthermore, the condition determining part 301 calculates the orientation of the lower traveling body 1 based on the value of the inclination angle Θ of the work surface measured by the inclination sensor 40 and the measured value of the turning angle of the upper turning body 3. The condition determining part 301 may determine whether the lower traveling body 1 is traveling on sloping ground in a downward direction based on the calculated orientation of the lower traveling body 1 and the measured value of a pilot pressure commensurate with the operating state of the lower traveling body 1. Furthermore, the condition determining part 301 may obtain information on the position, speed, etc., of the shovel 500 (body) based on the detection information of various sensors (for example, an IMU) mounted on the body or the attachment, and determine, from the obtained information, whether the lower traveling body 1 is traveling on sloping ground in a downward direction.

In this case, the condition determining part 301 may determine that the shovel 500 is on sloping ground when the inclination angle θ of the work surface on which the shovel 500 is positioned is greater than or equal to a threshold Θth. The same is true for the case where it is determined whether the shovel 500 is likely to enter sloping ground. According to this, when the threshold Θth is suitably determined, gradually sloping ground where the shovel 500 is less likely to tip over is excluded. Therefore, it is possible to prevent unnecessary attitude stabilization control or occupant protection control. The same is true for a second example and a third example of the attitude stabilization control device 200 described below.

Furthermore, the threshold Θth may be changed according to the weight of a load such as soil loaded in the bucket 6 which corresponds to the detecting signal of the weight sensor 49. Specifically, the threshold Θth may decrease as the weight of a load (load weight), such as soil loaded in the bucket 6 or a load suspended from a hook that is not depicted, at the distal end of the attachment increases. This is because the shovel 500 is more likely to tip over in the downward direction of sloping ground with a greater load weight at the distal end of the attachment. The same is true for the second example and the third example of the attitude stabilization control device 200 described below.

Hereinafter, the case where it is determined by the condition determining part 301 that the lower traveling body 1 is traveling on sloping ground in a downward direction may be simply referred to as "the case where the lower traveling body 1 is traveling on sloping ground in a downward direction."

Furthermore, the controller 30 may perform the attitude stabilization control and the occupant protection control when the lower traveling body 1 is likely to travel on sloping ground in a downward direction. That is, the control application condition is that "the lower traveling body 1 is likely to travel on sloping ground in a downward direction," and the condition determining part 301 may determine whether the lower traveling body 1 is likely to travel on sloping ground in a downward direction. According to this, the controller 30 can start the attitude stabilization control and the occupant protection control before the lower traveling body 1 travels on sloping ground in a downward direction. Therefore, it is possible to increase the achievability of the attitude stabilization and occupant protection of the shovel 500 to further improve the safety of the shovel 500. In this case, the case where the shovel 500 is likely to travel on sloping ground in a downward direction may include the case where the shovel 500 is likely to enter sloping ground and is likely to travel on sloping ground in a downward direction after the entry.

For example, when the operator is seated in the operator seat and work has been stopped for a predetermined time with the shovel 500 on sloping ground, the condition determining part 301 may determine that the shovel 500 has finished working on the sloping ground and is likely to travel on the sloping ground in a downward direction. In this case, the condition determining part 301 may determine whether work is stopped based on the detected value of a pilot pressure commensurate with the operating state of the operating apparatus 26 input from the pressure sensor 29. Furthermore, for example, when the shovel 500 having stopped working on sloping ground makes a change in direction to set the travel direction of the lower traveling body 1 to a downward direction, the condition determining part 301 may determine that the shovel 500 has finished working on the sloping ground and is likely to travel on the sloping ground in the downward direction. In this case, the condition determining part 301 may determine that a change in direction to set the travel direction of the lower traveling body 1 to a downward direction has been made, based on a detection value corresponding to the operating state of the pedal 26C input from the pressure sensor 29.

Furthermore, for example, when the shovel 500 is traveling from a substantially horizontal plane surface on the top side to sloping ground on the lower traveling body 1 and a distance to the boundary between the top-side plane surface and the sloping ground is less than or equal to a threshold, the condition determining part 301 may determine that the shovel 500 is likely to enter the sloping ground and travel in a downward direction.

Hereinafter, the case where it is determined by the condition determining part 301 that the lower traveling body 1 is likely to travel on sloping ground in a downward direction may be simply referred to as "the case where the lower traveling body 1 is likely to travel on sloping ground in a downward direction."

Thus, according to this example, the attitude stabilization control device 200 (the controller 30) performs the attitude stabilization control and the occupant protection control when the shovel 500 is traveling or is likely to travel on sloping ground in a downward direction on the lower traveling body 1. That is, the control application condition includes at least one of that "the lower traveling body 1 is traveling on sloping ground in a downward direction" and that "the lower traveling body 1 is likely to travel on sloping ground in a downward direction."

The details of processes with respect to the attitude stabilization control and the occupant protection control are described below.

[Specific Examples of Warning Outputting Process]

Figure 7B:
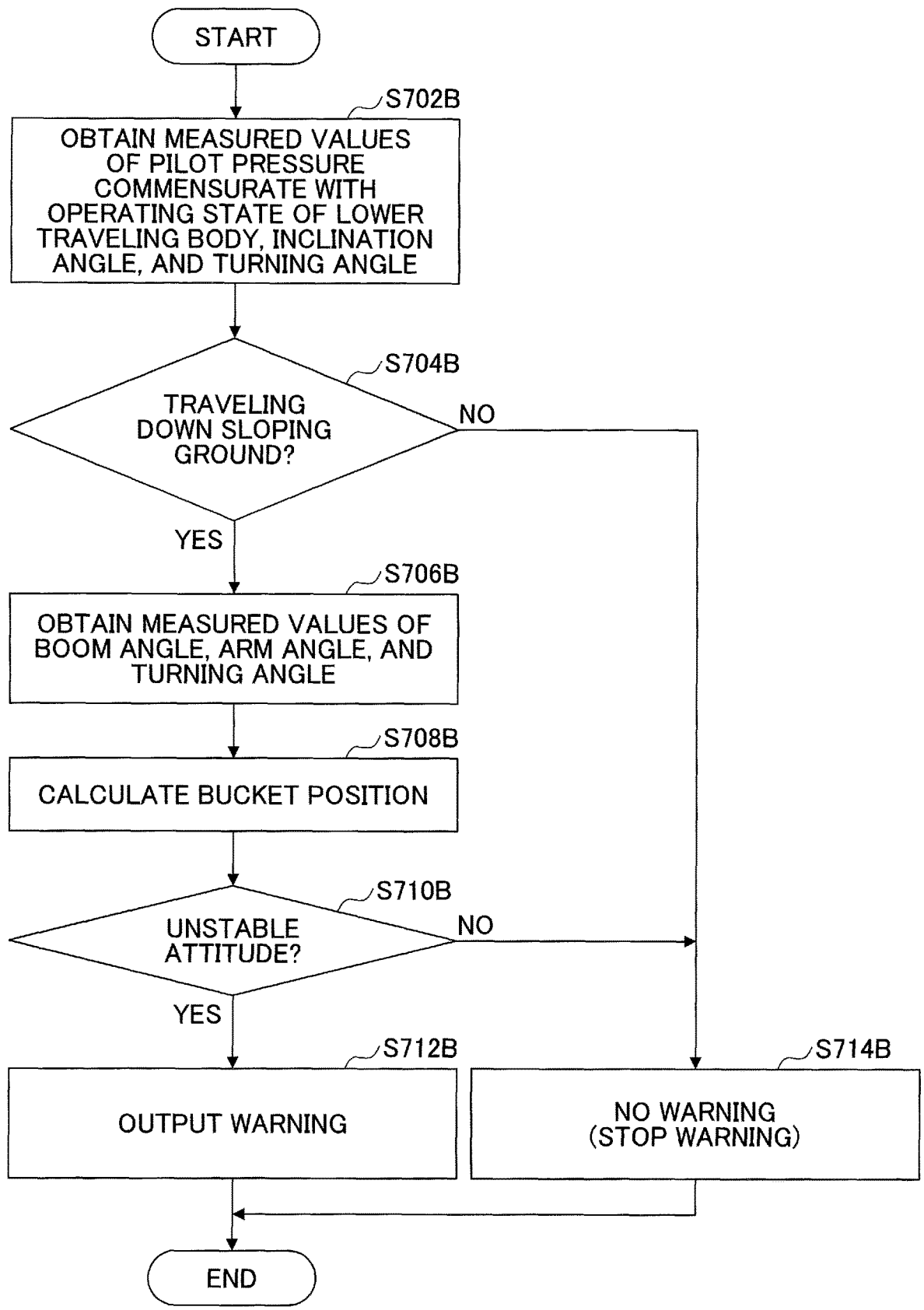
FIG. 7B is a flowchart schematically illustrating another example of the warning outputting process by the controller.

FIGS. 7A and 7B are flowcharts illustrating specific examples of the warning outputting process by the controller 30 corresponding to the first example of the attitude stabilization control device 200 according to this embodiment.

First, FIG. 7A is a flowchart schematically illustrating an example of the warning outputting process by the controller 30 corresponding to the first example of the attitude stabilization control device 200 according to this embodiment. The process according to this flowchart is repeatedly executed at predetermined time intervals during the operation of the shovel 500, for example. The same is true for the flowcharts of FIGS. 7B, 8A, 8B, 9, 10A, 10B, 11A and 11B described below.

At step S702A, the condition determining part 301 obtains the measured values of a pilot pressure commensurate with the operating state of the lower traveling body 1, an inclination angle, and a turning angle input from the pressure sensor 29, the inclination sensor 40, and the turning angle sensor 46, respectively.

At step S704A, the condition determining part 301 determines whether the lower traveling body 1 is traveling on sloping ground in a downward direction. The condition determining part 301 proceeds to step S706A if the lower traveling body 1 is traveling on sloping ground in a downward direction, and otherwise, proceeds to step S708A.

At this step, the condition determining part 301 may determine whether the lower traveling body 1 is likely to travel on sloping ground in a downward direction as described above. Furthermore, at this step, the condition determining part 301 may determine whether the shovel 500 on sloping ground corresponds to either the state where the lower traveling body 1 is traveling on the sloping ground in a downward direction or the state where the lower traveling body 1 is likely to travel on the sloping ground in a downward direction. The same is true for steps S704B, S804A, S804B, S904, S1004A, S1004B, S1104A and S1104B of FIGS. 7B, 8A, 8B, 9, 10A, 10B, 11A and 11B described below.

At step S706A, the attitude stabilization processing part 303 outputs a warning to alert the operator to the tipping of the shovel 500 through the display device 50 or the audio output device 52, and ends the process of this time.

At step S708A, the attitude stabilization processing part 303 outputs no warning, or if a warning has been output, stops the warning, and ends the process of this time.

When the lower traveling body 1 is traveling on sloping ground in a downward direction, the chances of the shovel 500 tipping over in the downward direction increase depending on the state of travel (for example, speed, acceleration, etc.) of the lower traveling body 1 and the attitude state of the upper turning body 3 and the attachment. According to this example, a warning is output when the lower traveling body 1 is traveling on sloping ground in a downward direction. Therefore, it is possible to call attention to tipping in a downward direction when the shovel 500 travels downward on sloping ground.

Next, FIG. 7B is a flowchart schematically illustrating another example of the warning outputting process by the controller 30 corresponding to the first example of the attitude stabilization control device 200 according to this embodiment.

A description of the process of steps S702B and S704B, which is the same as that of steps S702A and S704A of FIG. 7A, is omitted.

If it is determined at step S704B that the lower traveling body 1 is traveling on sloping ground in a downward direction, at step S706B, the attitude obtaining part 302 obtains the measured values of a boom angle, an arm angle, and a turning angle input from the boom angle sensor 42, the arm angle sensor 44, and the turning angle sensor 46, respectively.

At step S708B, the attitude obtaining part 302 calculates the bucket position.

At step S710B, the attitude stabilization processing part 303 determines whether the current attitude of the shovel 500 corresponds to an unstable attitude based on the calculated bucket position. The attitude stabilization processing part 303 proceeds to step S712B if the current attitude of the shovel 500 corresponds to an unstable attitude, and otherwise, proceeds to step S714B.

A description of the process of steps S712B and S714B, which is the same as that of steps S706A and S708A of FIG. 7A, is omitted.

According to this example, a warning is output only when the shovel 500 is in an unstable attitude. Therefore, as described above, it is possible to prevent the operator from being bothered by the outputting of a warning in a situation where the shovel 500 is not in an unstable attitude and is unlikely to tip over.

[Specific Examples of First Movement Restricting Process]

Figure 8A:
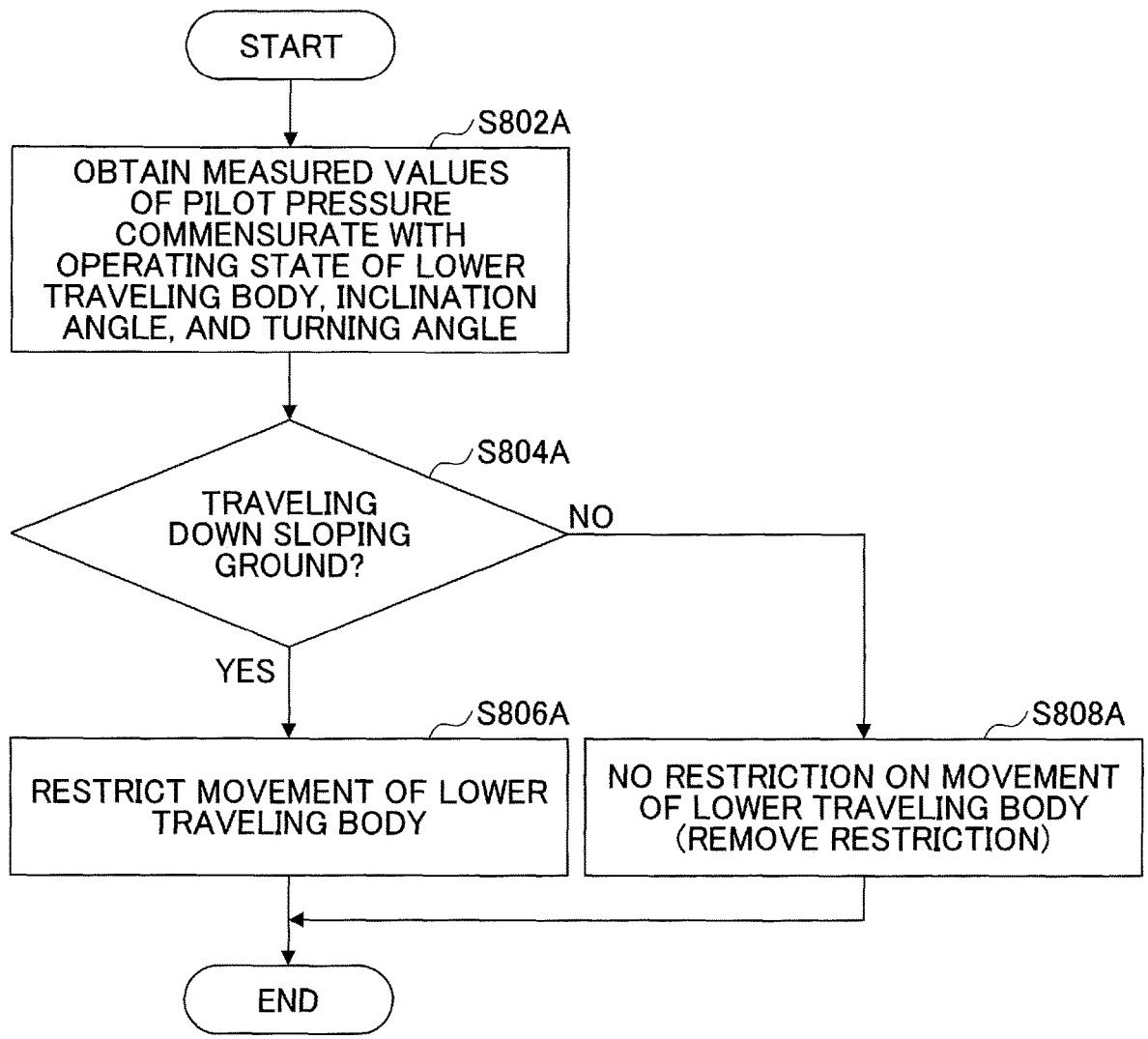
FIG. 8A is a flowchart schematically illustrating an example of a first movement restricting process by the controller.
Figure 8B:
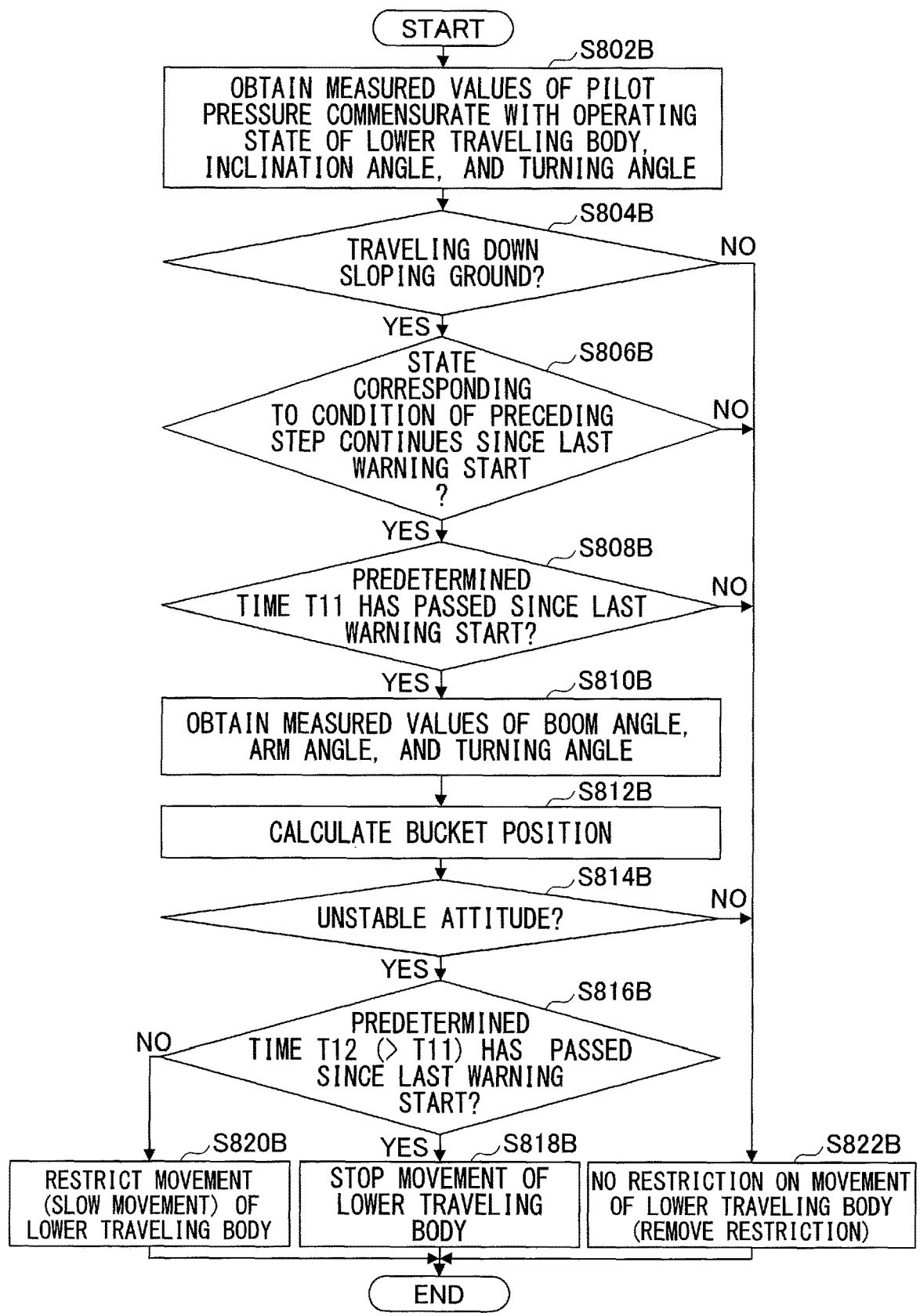
FIG. 8B is a flowchart schematically illustrating another example of the first movement restricting process by the controller.

FIGS. 8A and 8B are flowcharts illustrating specific examples of the first movement restricting process by the controller 30 corresponding to the first example of the attitude stabilization control device 200 according to this embodiment.

First, FIG. 8A is a flowchart schematically illustrating an example of the first movement restricting process by the controller 30 corresponding to the first example of the attitude stabilization control device 200 according to this embodiment.

A description of the process of steps S802A and S804A, which is the same as that of steps S702A and S704A of FIG. 7A, is omitted.

If it is determined at step S804A that the lower traveling body 1 is traveling on sloping ground in a downward direction, at step S806A, the attitude stabilization processing part 303 restricts the movement of the lower traveling body 1 by outputting a control command to the reducing valve 54, and ends the process of this time.

If it is determined at step S804A that the lower traveling body 1 is not traveling on sloping ground in a downward direction, at step S808A, the attitude stabilization processing part 303 does not restrict the movement of the lower traveling body 1, or if the movement of the lower traveling body 1 has been restricted, removes the restriction on the movement of the lower traveling body 1 by outputting a control command to the reducing valve 54, and ends the process of this time.

As described above, when the lower traveling body 1 is traveling on sloping ground in a downward direction, the chances of the shovel 500 tipping over in the downward direction increase depending on the state of travel (for example, speed, acceleration, etc.) of the lower traveling body 1 and the attitude state of the upper turning body 3 and the attachment. According to this example, when the lower traveling body 1 is traveling on sloping ground in a downward direction, the movement of the lower traveling body 1 is restricted, so that a sudden movement, the travel speed, etc., of the lower traveling body 1 in the downward direction of the sloping ground are controlled. Therefore, it is possible to prevent the tipping of the shovel 500 in the downward direction.

At step S806A, the attitude stabilization processing part 303 may restrict the movements of the upper turning body 3 and the attachment instead of or in addition to the lower traveling body 1. That is, at step S806A, the attitude stabilization processing part 303 may restrict the movement of at least one of the lower traveling body 1, the upper turning body 3, and the attachment. According to this, when the lower traveling body 1 is traveling on sloping ground in a downward direction, the movement of the upper turning body 3 can be restricted. According to this, for example, a sudden movement and the turning speed of the upper turning body 3 in the case of such turning as to orient the attachment in the downward direction are controlled. Therefore, it is possible to prevent the tipping of the shovel 500 in the downward direction. Furthermore, in the case where the lower traveling body 1 is traveling on sloping ground in a downward direction, the movement of the attachment can be restricted. According to this, for example, a sudden movement and the movement speed of the attachment in the case where the attachment is oriented in the downward direction are controlled. Accordingly, a sudden change in the moment of inertia of the attachment is controlled, so that it is possible to prevent the tipping of the shovel 500 in the downward direction. In this case, at step S808A, the attitude stabilization processing part 303 outputs a control command to the reducing valve 54 corresponding to a motion element whose movement is restricted or stopped at step S806A. Furthermore, the same as in FIG. 7B, only when the shovel 500 is in an unstable attitude, the movement of at least one of the lower traveling body 1, the upper turning body 3, and the attachment may be restricted. According to this, while preventing the tipping of the shovel 500 in an unstable attitude, it is possible to control the feeling of strangeness of the operator or reduction in the work efficiency of the operator due to restriction of the movement of the lower traveling body 1, etc., of the shovel 500 that is not in an unstable attitude, namely, the shovel 500 in an attitude state that is less likely to cause tipping. In this case, this process is implemented by adding the process of steps S706B through S710B of FIG. 7B between step S804A and steps S806A and S808A of this example.

Next, FIG. 8B is a flowchart schematically illustrating another example of the first movement restricting process by the controller 30 corresponding to the first example of the attitude stabilization control device 200 according to this embodiment.

A description of the process of steps S802B and S804B, which is the same as that of steps S702A and S704A of FIG. 7A, is omitted.

If it is determined at step S804B that the lower traveling body 1 is traveling on sloping ground in a downward direction, at step S806B, the attitude stabilization processing part 303 determines whether the state corresponding to the condition of step S804B continues since the last warning output (warning start). That is, the attitude stabilization processing part 303 determines whether the state where the lower traveling body 1 is traveling on sloping ground in a downward direction continues since the last warning start. For example, the attitude stabilization processing part 303 increments a flag if the determination condition is satisfied in the process of step S804B and initializes the flag (to zero) if the determination condition is not satisfied, after the start of a warning. As a result, the attitude stabilization processing part 303 can determine, based on the value of the flag, whether the state where the lower traveling body 1 is traveling on sloping ground in a downward direction continues since the last warning start. The attitude stabilization processing part 303 proceeds to step S808B if the condition is satisfied, and proceeds to step S822B if the condition is not satisfied.

At step S808B, the attitude stabilization processing part 303 determines whether a predetermined time T11 (>0) or more has passed since the last warning output (warning start). The attitude stabilization processing part 303 proceeds to step S810B if the predetermined time T11 or more has passed since the last warning output, and otherwise, proceeds to step S822B.

A description of the process of steps S810B through S814B, which is the same as that of steps S706B through S710B of FIG. 7B, is omitted.

If it is determined at step S814B that the shovel 500 is in an unstable attitude, at step S816B, the attitude stabilization processing part 303 determines whether a predetermined time T12 (>T11) or more has passed since the last warning output (warning start). The attitude stabilization processing part 303 proceeds to step S818B if the predetermined time T12 or more has passed since the last warning output, and otherwise, proceeds to step S820B.

At step S818B, the attitude stabilization processing part 303 stops the movement of the lower traveling body 1 by outputting a control command to the reducing valve 54, and ends the process of this time.

At step S820B, the attitude stabilization processing part 303 restricts the movement of the lower traveling body 1 by outputting a restriction command to the reducing valve 54 to moderate (slow) its movement, and ends the process of this time.

If the determination condition is not satisfied at step S804B, S806B, S808B, or S814B, at step S822B, the attitude stabilization processing part 303 does not restrict the movement of the lower traveling body 1, or if the movement of the lower traveling body 1 has been restricted (slowed or stopped), removes the restriction on the movement of the lower traveling body 1 by outputting a control command to the reducing valve 54, and ends the process of this time.

According to this example, in a situation where the lower traveling body 1 keeps on traveling on sloping ground in a downward direction, the movement of the lower traveling body 1 is restricted when the shovel 500 is still in an unstable attitude even after the output of a warning. Specifically, with the shovel 500 on sloping ground, if the predetermined time T11 or more has passed since the output of a warning and the lower traveling body 1 is still traveling on the sloping ground in a downward direction, the movement of the lower traveling body 1 is restricted when the shovel 500 is in an unstable attitude. As a result, as described above, while calling attention to the tipping of the shovel 500 through a warning, it is possible to restrict the movement of the lower traveling body 1 only when the shovel 500 nonetheless remains in an unstable attitude. Therefore, while preventing the tipping of the shovel 500, it is possible to further control the feeling of strangeness of the operator or reduction in the work efficiency of the operator due to restriction of the movement of the lower traveling body 1.

Furthermore, according to this example, the movement of the lower traveling body 1 is restricted when the predetermined time T11 or more has passed since the output of a warning with the shovel 500 remaining in an unstable attitude while the lower traveling body 1 keeps on traveling on sloping ground in a downward direction. Then, when the predetermined time T12 or more has passed without interruption since the output of the warning, the movement of the lower traveling body 1 is stopped. That is, the extent of restriction on the lower traveling body 1 increases stepwise with the passage of time since the warning, and the lower traveling body 1 is eventually stopped. According to this, while the shovel 500 is first allowed time for coming out of an unstable attitude by restricting the movement of the lower traveling body 1 in such a manner as to moderate the movement, the movement of the lower traveling body 1 is eventually stopped if no improvement is nonetheless made in the unstable attitude of the shovel 500, so that safety can be ensured.

The same as in the case of step S806A of FIG. 8A, at steps S818A and S820B, the attitude stabilization processing part 303 may restrict or stop the movements of the upper turning body 3 and the attachment instead of or in addition to the lower traveling body 1. That is, at steps S818A and S820B, the attitude stabilization processing part 303 may restrict or stop the movement of at least one of the lower traveling body 1, the upper turning body 3, and the attachment. In this case, of the lower traveling body 1, the upper turning body 3, and the attachment, a motion element whose movement is stopped at step S818B and a motion element whose movement is restricted at step S820B may be equal. Furthermore, at step S822B, the attitude stabilization processing part 303 outputs a control command to the reducing valve 54 corresponding to a motion element whose movement is restricted or stopped at step S818B or S820B.

[Specific Example of Stable Attitude Teaching Process]

FIG. 9 is a flowchart schematically illustrating an example of the stable attitude teaching process by the controller 30 corresponding to the first example of the attitude stabilization control device 200 according to this embodiment.

A description of the process of steps S902 and S904, which is the same as that of steps S702A and S704A of FIG. 7A, is omitted.

If it is determined at step S904 that the lower traveling body 1 is traveling on sloping ground in a downward direction, at step 906, the attitude stabilization processing part 303 teaches the operator the stable attitude of the shovel 500 through the display device 50 or the audio output device 52, and ends the process of this time.

If it is determined at step S904 that the lower traveling body 1 is not traveling on sloping ground in a downward direction, at step S908, the attitude stabilization processing part 303 does not teach the operator the stable attitude of the shovel 500, or if the teaching of the stable attitude of the shovel 500 has been started, stops the teaching, and ends the process of this time.

As described above, when the lower traveling body 1 is traveling on sloping ground in a downward direction, the shovel 500 may tip over in the downward direction depending on the state of travel (for example, speed, acceleration, etc.) of the lower traveling body 1 and the attitude state of the upper turning body 3 and the attachment. According to this example, when the lower traveling body 1 is traveling on sloping ground in a downward direction, the operator is taught the stable attitude of the shovel 500. As a result, as described above, the operator can operate the upper turning body 3 and the attachment such that the attitude or posture of the upper turning body 3, the attachment, etc., of the shovel 500 approaches the taught stable attitude. Therefore, the controller 30 can prevent the tipping of the shovel 500 in the downward direction when the shovel 500 is traveling in the downward direction.

The same as in FIG. 7B, the operator may be taught the stable attitude of the shovel 500 only when the shovel 500 is in an unstable attitude. According to this, while encouraging the operator to operate the upper turning body 3 and the attachment in such a manner as to approach the shovel 500 in an unstable attitude to a stable attitude, it is possible to prevent the operator of the shovel 500 that is already in a stable attitude from being unnecessarily taught a stable attitude. In this case, this process is implemented by adding the process of steps S706B through S710B of FIG. 7B between step S904 and steps S906 and S908 of this example.

[Specific Examples of Usage Check Notification Process]

Figure 10A:
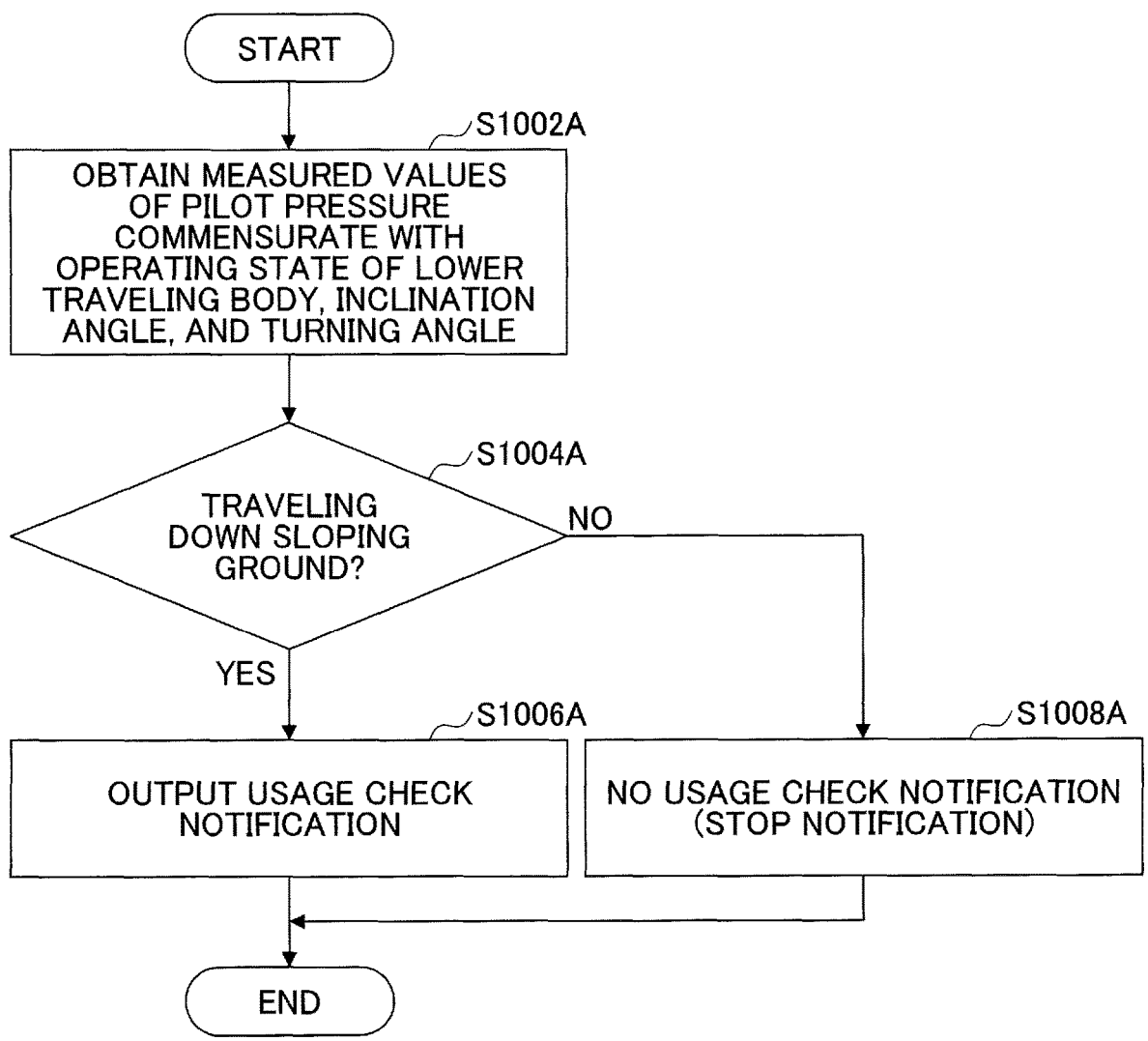
FIG. 10A is a flowchart schematically illustrating an example of a usage check notification process by the controller.
Figure 10B:
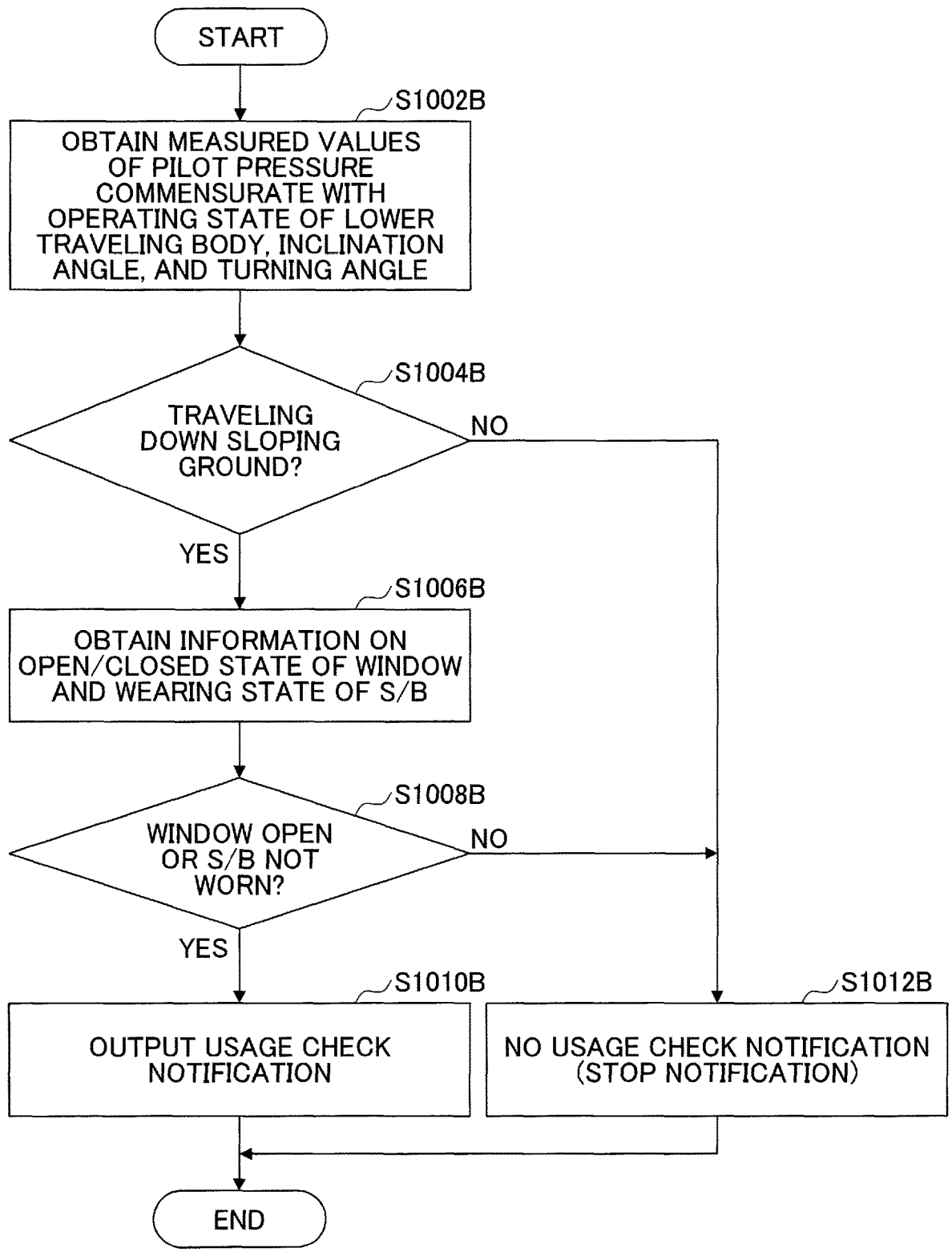
FIG. 10B is a flowchart schematically illustrating another example of the usage check notification process by the controller.

FIGS. 10A and 10B are flowcharts illustrating specific examples of the usage check notification process by the controller 30 corresponding to the first example of the attitude stabilization control device 200 according to this embodiment.

First, FIG. 10A is a flowchart schematically illustrating an example of the usage check notification process by the controller 30 corresponding to the first example of the attitude stabilization control device 200 according to this embodiment.

A description of the process of steps S1002A and S1004A, which is the same as that of steps S702A and S704A of FIG. 7A, is omitted.

If it is determined at step S1004A that the lower traveling body 1 is traveling on sloping ground in a downward direction, at step S1006A, the occupant protection processing part 304 outputs a usage check notification to the operator through the audio output device 52, and ends the process of this time.

At step S1008A, the occupant protection processing part 304 does not output a usage check notification, or if the output of a usage check notification has been started, stops the usage check notification, and ends the process of this time.

As described above, when the lower traveling body 1 is traveling on sloping ground in a downward direction, the shovel 500 may tip over in the downward direction depending on the state of travel (for example, speed, acceleration, etc.) of the lower traveling body 1 and the attitude state of the upper turning body 3 and the attachment. According to this example, a usage check notification is output when the lower traveling body 1 is traveling on sloping ground in a downward direction. As a result, it is possible to encourage the operator to use the safety equipment, and even if the shovel 500 tips over, the usage of the safety equipment makes it possible to prevent the operator from being thrown out of the cabin 10.

According to this example, a usage check notification continues to be output as long as the lower traveling body 1 keeps on traveling on sloping ground in a downward direction. The usage check notification, however, may be stopped when a predetermined time has passed since the start of the output of the usage check notification or may be stopped when the usage check notification is reproduced in audio a predetermined number of times, for example. This makes it possible to prevent the operator from being bothered by the continuous outputting of a usage check notification while encouraging the operator to use the safety equipment.

Next, FIG. 10B is a flowchart schematically illustrating another example of the usage check notification process by the controller 30 corresponding to the first example of the attitude stabilization control device 200 according to this embodiment.

A description of the process of steps S1002B and S1004B, which is the same as that of steps S702A and S704A of FIG. 7A, is omitted.

If it is determined at step S1004B that the lower traveling body 1 is traveling on sloping ground in a downward direction, at step S1006B, the occupant protection processing part 304 obtains information on the open/closed state of the window of the cabin 10 and the wearing state of the seat belt input from the window open/closed state detecting part 47 and the seat belt wearing state detecting part 48.

At step S1008B, the occupant protection processing part 304 determines whether or not the window of the cabin 10 is open or the seat belt is not worn. The occupant protection processing part 304 proceeds to step S1010B if the window of the cabin 10 is open or the seat belt is not worn, and proceeds to step S1012B if the window of the cabin 10 is closed and the seat belt is worn.

A description of the process of steps S1010B and S1012B, which is the same as that of steps S1006A and S1008A of FIG. 10A, is omitted.

According to this example, a usage check notification is made only when the safety equipment is unused (the window is open or the seat belt is not worn). Therefore, as described above, it is possible to prevent an unnecessary usage check notification and to prevent the operator from being bothered by an unnecessary usage check notification.

[Specific Examples of Second Movement Restricting Process]

Figure 11A:
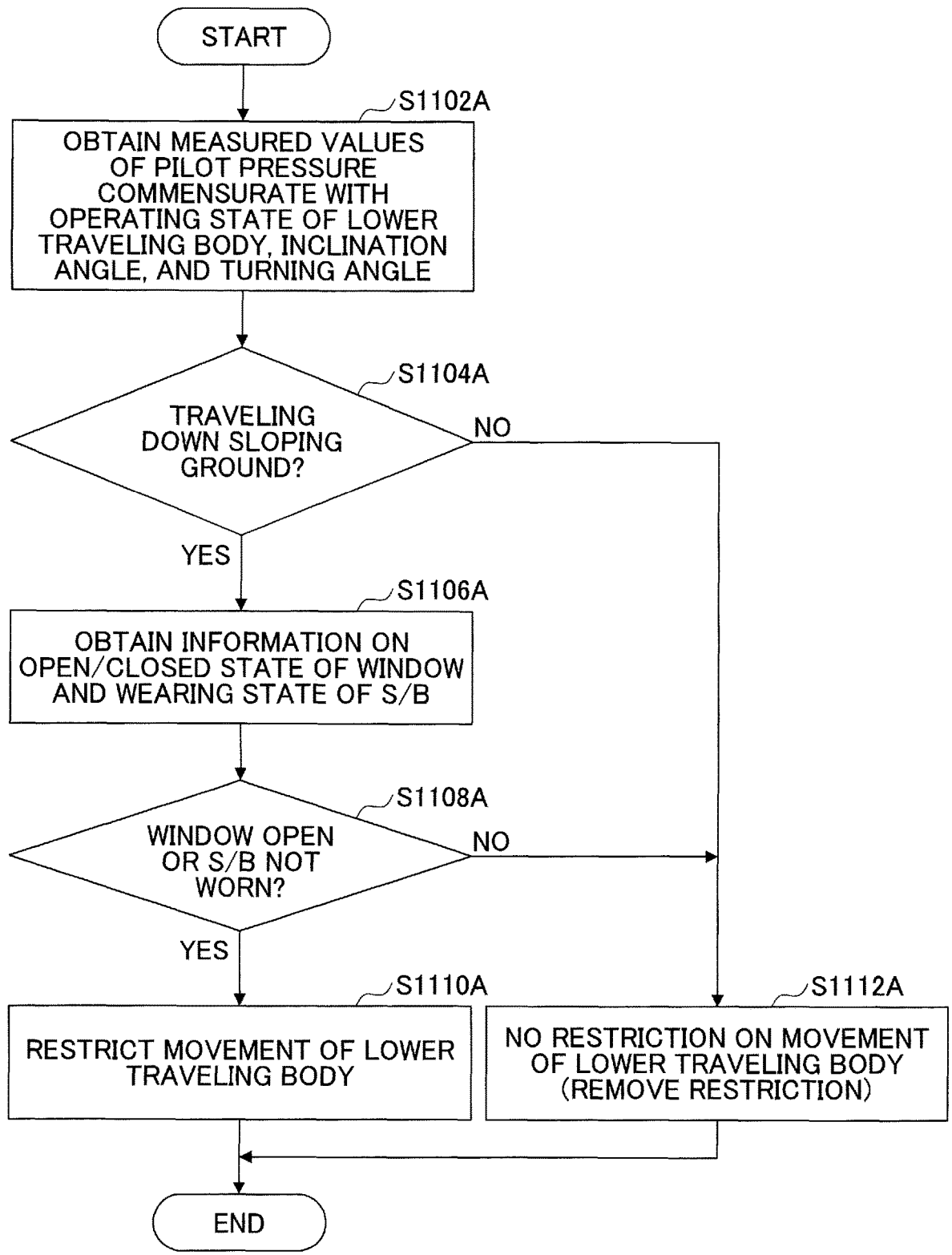
FIG. 11A is a flowchart schematically illustrating an example of a second movement restricting process by the controller.
Figure 11B:
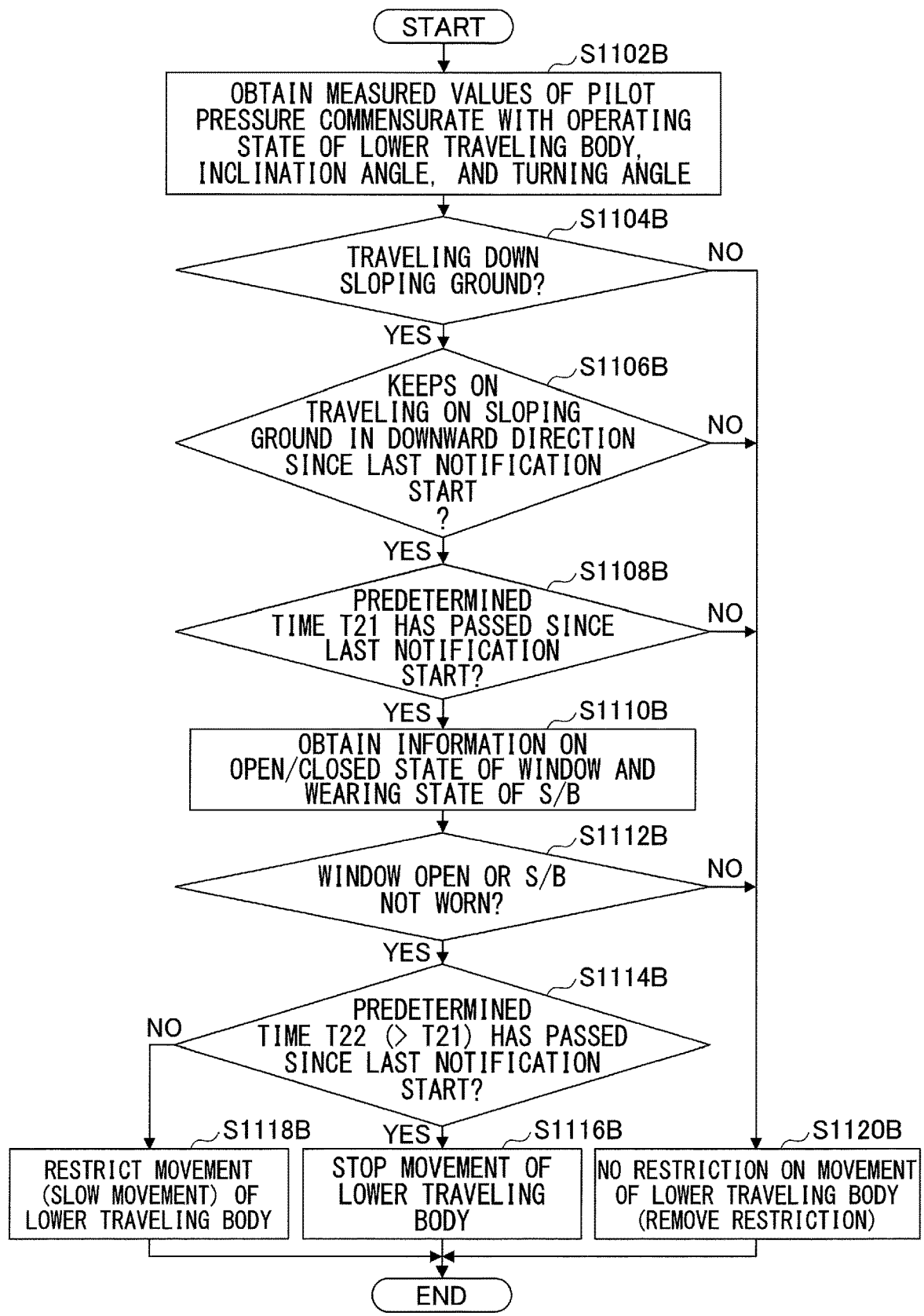
FIG. 11B is a flowchart schematically illustrating another example of the second movement restricting process by the controller.

FIGS. 11A and 11B are flowcharts illustrating specific examples of the second movement restricting process by the controller 30 corresponding to the first example of the attitude stabilization control device 200 according to this embodiment.

First, FIG. 11A is a flowchart schematically illustrating an example of the second movement restricting process by the controller 30 corresponding to the first example of the attitude stabilization control device 200 according to this embodiment.

A description of the process of steps S1102A through S1108A, which is the same as that of steps S1002B through S1008B of FIG. 10B, is omitted.

If it is determined at step S1108A that the window of the cabin 10 is open or the seat belt is not worn, at step S1110A, the occupant protection processing part 304 restricts the movement of the lower traveling body 1 by outputting a control command to the reducing valve 54, and ends the process of this time.

If it is determined at step S1108A that the window of the cabin 10 is closed and the seat belt is worn, at step S1112A, the occupant protection processing part 304 does not restrict the movement of the lower traveling body 1, or if the movement of the lower traveling body 1 has been restricted, removes the restriction on the movement of the lower traveling body 1 by outputting a control command to the reducing valve 54, and ends the process of this time.

According to this example, when the safety equipment is not used, the movement of the lower traveling body 1 is restricted. As a result, a sudden movement and the travel speed of the lower traveling body 1 in the downward direction of the sloping ground are controlled. Therefore, it is possible to prevent the tipping of the shovel 500 in the downward direction and to ensure the safety of the operator who is not using the safety equipment.

The same as in the case of step S806A of FIG. 8A, at step S1110A, the occupant protection processing part 304 may restrict the movements of the upper turning body 3 and the attachment instead of or in addition to the lower traveling body 1. That is, at step S1110A, the occupant protection processing part 304 may restrict the movement of at least one of the lower traveling body 1, the upper turning body 3, and the attachment as described above.

Next, FIG. 11B is a flowchart schematically illustrating another example of the second movement restricting process by the controller 30 corresponding to the first example of the attitude stabilization control device 200 according to this embodiment.

A description of the process of steps S1102B and S1104B, which is the same as that of steps S702A and S704A of FIG. 7A, is omitted.

If it is determined at step S1104B that the lower traveling body 1 is traveling on sloping ground in a downward direction, at step S1106B, the occupant protection processing part 304 determines whether the state corresponding to the condition of step S1104B continues since the last output of a usage check notification (start of a usage check notification). That is, the occupant protection processing part 304 determines whether the state where the lower traveling body 1 is traveling on sloping ground in a downward direction continues since the last start of a usage check notification. For example, the occupant protection processing part 304 increments a flag if the determination condition is satisfied in the process of step S1104B and initializes the flag (to zero) if the determination condition is not satisfied, after the start of a usage check notification. As a result, the occupant protection processing part 304 can determine, based on the value of the flag, whether the state where the lower traveling body 1 is traveling on sloping ground in a downward direction continues since the last start of a usage check notification. The occupant protection processing part 304 proceeds to step S1108B if the condition is satisfied, and proceeds to step S1120B if the condition is not satisfied.

At step S1108B, the occupant protection processing part 304 determines whether a predetermined time T21 (>0) or more has passed since the last output of a usage check notification (start of a usage check notification). The occupant protection processing part 304 proceeds to step S1110B if the predetermined time T21 or more has passed since the last start of a usage check notification, and otherwise, proceeds to step S1120B.

A description of the process of steps S1110B and S1112B, which is the same as that of steps S1006B and S1008B, is omitted.

If it is determined at step S1112B that the window of the cabin 10 is open or the seat belt is not worn, at step S1114B, the occupant protection processing part 304 determines whether a predetermined time T22 (>T21) or more has passed since the last output of a usage check notification (start of a usage check notification). The occupant protection processing part 304 proceeds to step S1116B if the predetermined time T22 or more has passed since the last output of a usage check notification, and otherwise, proceeds to step S1118B.

At step S1116B, the occupant protection processing part 304 stops the movement of the lower traveling body 1 by outputting a control command to the reducing valve 54, and ends the process of this time.

At step S1118B, the occupant protection processing part 304 restricts the movement of the lower traveling body 1 by outputting a restriction command to the reducing valve 54 to moderate (slow) its movement, and ends the process of this time.

The same as in the case of step S806A of FIG. 8A, at steps S1106B and S1118B, the occupant protection processing part 304 may restrict the movements of the upper turning body 3 and the attachment instead of or in addition to the lower traveling body 1. That is, at steps S1106B and S1118B, the occupant protection processing part 304 may restrict the movement of at least one of the lower traveling body 1, the upper turning body 3, and the attachment as described above. In this case, of the lower traveling body 1, the upper turning body 3, and the attachment, a motion element whose movement is stopped at step S1116B and a motion element whose movement is restricted at step S1118B may be equal.

If the determination condition is not satisfied at step S1104B, S1106B, S1108B, or S1112B, at step S1120B, the occupant protection processing part 304 does not restrict the movement of the lower traveling body 1, or if the movement of the lower traveling body 1 has been restricted (slowed or stopped), removes the restriction on the movement of the lower traveling body 1 by outputting a control command to the reducing valve 54, and ends the process of this time.

According to this example, in a situation where the lower traveling body 1 keeps on traveling on sloping ground in a downward direction, the movement of the lower traveling body 1 is restricted when the safety equipment is not yet used even after a usage check notification is made. According to this, as described above, while encouraging the operator to use the safety equipment through a usage check notification, it is possible to restrict the movement of the lower traveling body 1 only when the safety equipment nonetheless remains unused. Therefore, it is possible to control the feeling of strangeness of the operator or reduction in the work efficiency of the operator due to restriction of the movement of the lower traveling body 1 while ensuring the safety of the operator who is not using the safety equipment.

Furthermore, according to this example, the movement of the lower traveling body 1 is restricted when the predetermined time T21 or more has passed since the output of a usage check notification with the safety equipment remaining unused while the lower traveling body 1 keeps on traveling on sloping ground in a downward direction. Then, when the predetermined time T22 or more has passed without interruption since the output of the usage check notification, the movement of the lower traveling body 1 is stopped. That is, the extent of restriction on the lower traveling body 1 increases stepwise with the passage of time since the start of a usage check notification, and the lower traveling body 1 is eventually stopped. According to this, as described above, while allowing time for closing the window or putting on the seat belt by restricting the movement of the lower traveling body 1 in such a manner as to moderate the movement, the movement of the lower traveling body 1 is eventually stopped if the safety equipment nonetheless remains unused, so that safety can be ensured.

<Effects>

Thus, according to this example, when the lower traveling body 1 is traveling or is likely to travel on sloping ground in a downward direction while the shovel 500 is on the sloping ground, the attitude stabilization processing part 303 outputs a waring that calls attention to the tipping of the shovel 500 in the downward direction.

This enables the shovel 500 (the attitude stabilization control device 200) to alert the operator to the tipping of the shovel 500 in a downward direction when the shovel 500 travels downward on sloping ground. Therefore, it is possible to prevent the tipping of the shovel 500 in the downward direction of sloping ground.

Furthermore, according to this example, when the lower traveling body 1 is traveling or is likely to travel on sloping ground in a downward direction while the shovel 500 is on the sloping ground, the attitude stabilization processing part 303 outputs a waring when the shovel 500 is in an unstable attitude.

This enables the shovel 500 (the attitude stabilization control device 200) to make the operator aware that the current attitude of the shovel 500 is deviated from a stable attitude. Accordingly, it is possible to encourage the operator to improve the unstable attitude of the shovel 500, and to further ensure that the tipping of the shovel 500 is avoided. Furthermore, a warning that calls attention to the tipping of the shovel 500 in a downward direction is output only when the shovel 500 is in an unstable attitude. Therefore, it is possible to prevent the operator from being bothered by the outputting of a warning in a situation where the shovel 500 is not in an unstable attitude and is unlikely to tip over.

Furthermore, according to this example, when the lower traveling body 1 is traveling or is likely to travel on sloping ground in a downward direction while the shovel 500 is on the sloping ground, the attitude stabilization processing part 303 restricts the movement of the lower traveling body 1 when the shovel 500 is in an unstable attitude.

According to this, a sudden movement and the travel speed of the lower traveling body 1 in the downward direction of sloping ground are controlled. Therefore, the shovel 500 (the attitude stabilization control device 200) can prevent the tipping of the shovel 500 in the downward direction.

Furthermore, according to this example, with the shovel 500 on sloping ground, if the predetermined time T11 or more has passed since the output of a warning and the lower traveling body 1 is still traveling or still likely to travel on the sloping ground in a downward direction, the attitude stabilization processing part 303 restricts the movement of the lower traveling body 1 when the shovel 500 is in an unstable attitude.

According to this, while preventing the tipping of the shovel 500 in an unstable attitude, the shovel 500 (the attitude stabilization control device 200) can control the feeling of strangeness of the operator or reduction in the work efficiency of the operator due to restriction of the movement of the lower traveling body 1 of the shovel 500 that is not in an unstable attitude, namely, the shovel 500 in an attitude state that is less likely to cause tipping.

Furthermore, according to this example, when the lower traveling body 1 is traveling or is likely to travel on sloping ground in a downward direction while the shovel 500 is on the sloping ground, the attitude stabilization processing part 303 teaches the operator the stable attitude of the shovel 500 that prevents its tipping.

This enables the shovel 500 (the attitude stabilization control device 200) to encourage the operator to perform such operations as to achieve the stable attitude of the shovel 500. Accordingly, when the shovel 500 travels on sloping ground in a downward direction on the lower traveling body 1, it is possible to prevent the tipping of the shovel 500 in the downward direction according to the operator's operations.

Furthermore, according to this example, when the lower traveling body 1 is traveling or is likely to travel on sloping ground in a downward direction while the shovel 500 is on the sloping ground, the attitude stabilization processing part 303 teaches the operator the stable attitude of the shovel 500 when the shovel 500 is in an unstable attitude.

According to this, while encouraging the operator to operate the attachment and the upper turning body 3 in such a manner as to approach the shovel 500 in an unstable attitude to a stable attitude, the shovel 500 (the attitude stabilization control device 200) can prevent the operator of the shovel 500 that is already in a stable attitude from being unnecessarily taught a stable attitude.

Furthermore, according to this example, the attitude stabilization processing part 303 teaches a stable attitude by encouraging the operator to so operate the attachment as to bring the bucket 6 closer to the ground.

This enables the shovel 500 (the attitude stabilization control device 200) to teach the operator a specific way of operating the attachment for achieving the stable attitude of the shovel 500. Furthermore, as a result of the attachment being so operated as to bring the bucket 6 closer to the ground, even if the shovel 500 almost tips over in the downward direction of sloping ground, the bucket 6 touches the ground to make it possible to specifically avoid the tipping of the shovel 500 as described above.

Furthermore, according to this example, the attitude stabilization processing part 303 teaches a stable attitude by encouraging the operator to operate the upper turning body 3 in such a manner as to reduce the difference between the orientation of the attachment on the upper turning body 3 and the travel direction of the lower traveling body 1.

This enables the shovel 500 (the attitude stabilization control device 200) to teach the operator a specific way of operating the upper turning body 3 for achieving the stable attitude of the shovel 500. Furthermore, as a result of the upper turning body 3 being so turned as to reduce the difference between the orientation of the attachment and the travel direction of the lower traveling body 1, it is possible to ensure that the bucket 6 touches the ground on the travel direction side of the lower traveling body 1. As a result, the attachment can firmly stand on the travel direction side of the lower traveling body 1. Accordingly, it is possible to further ensure that the tipping of the shovel 500 is avoided.

Furthermore, according to this embodiment, a stable attitude corresponds to the posture state of the attachment in which the height of the bucket 6 from the ground is less than or equal to the threshold Hth2 determined with reference to the height dimension of the cabin 10.

This enables the shovel 500 (the attitude stabilization control device 200) to teach the operator such a specific posture state of the attachment as to bring the bucket 6 closer to the ground as a stable attitude.

Furthermore, according to this example, a stable attitude corresponds to the turning state of the upper turning body 3 where the angular difference between the orientation of the attachment on the upper turning body 3 and the travel direction of the lower traveling body 1 as seen in the plan view is less than or equal to the threshold θth2 determined with reference to the widthwise positional relationship between the bucket 6 and the lower traveling body 1 as seen in the plan view.

This makes it possible to teach the operator, in addition to the posture state of the attachment, such a specific turning state of the upper turning body 3 as to reduce the difference between the orientation of the attachment and the travel direction of the lower traveling body 1 as much as possible as a stable attitude.

Furthermore, according to this example, the attitude stabilization processing part 303 teaches the operator a stable attitude by displaying an image of the shovel 500 corresponding to the stable attitude (for example, the shovel image 601) on the display device 50.

This enables the shovel 500 (the attitude stabilization control device 200) to make the operator intuitively understand the stable attitude of the shovel 500.

Furthermore, according to this example, when the lower traveling body 1 is traveling or is likely to travel on sloping ground in a downward direction while the shovel 500 is on the sloping ground, the occupant protection processing part 304 outputs a notification to encourage the closure of a cabin window or a notification to encourage the wearing of a seat belt to the operator.

This enables the shovel 500 (the attitude stabilization control device 200) to encourage the operator to appropriately use the safety equipment, such as to wear the seat belt or to close the window of the cabin 10. Therefore, even if the shovel 500 tips over in the downward direction of sloping ground, it is possible to prevent the operator from being thrown out of the cabin 10.

Furthermore, according to this example, when the lower traveling body 1 is traveling or is likely to travel on sloping ground in a downward direction while the shovel 500 is on the sloping ground, the occupant protection processing part 304 outputs a notification to the operator when the window is not closed or the seat belt is not worn.

This prevents the shovel 500 (the attitude stabilization control device 200) from making a usage check notification in such a case where the window is closed and the seat belt is worn. Therefore, it is possible to prevent an unnecessary usage check notification. Accordingly, it is possible to prevent the operator from being bothered by an unnecessary usage check notification.

Furthermore, according to this example, when the lower traveling body 1 is traveling or is likely to travel on sloping ground in a downward direction while the shovel 500 is on the sloping ground, the occupant protection processing part 304 restricts the movement of the lower traveling body 1 when the window is not closed or the seat belt is not worn.

This enables the shovel 500 (the attitude stabilization control device 200) to control a sudden movement and the travel speed of the lower traveling body 1 in the downward direction of sloping ground. Accordingly, it is possible to prevent the tipping of the shovel 500 in the downward direction to ensure the safety of the operator who leaves the window open or is not wearing the seat belt.

Furthermore, according to this example, when the predetermined time T21 or more has passed since the output of a notification by the occupant protection processing part 304 and the lower traveling body 1 is still traveling or still likely to travel on sloping ground in a downward direction while the shovel 500 is on the sloping ground, the occupant protection processing part 304 restricts the movement of the lower traveling body 1 when the window is not closed or the seat belt is not worn.

According to this, while encouraging the operator to close the window or wear the seat belt through a usage check notification, the shovel 500 (the attitude stabilization control device 200) can restrict the movement of the lower traveling body 1 only when no improvement is nonetheless made. Therefore, it is possible to control the feeling of strangeness of the operator or reduction in the work efficiency of the operator due to restriction of the movement of the lower traveling body 1 while ensuring the safety of the operator who leaves the window open or is not wearing the seat belt.

According to this example, naturally, the attitude stabilization processing part 303 and the occupant protection processing part 304 may perform the attitude stabilization control or the occupant protection control when the shovel 500 is on or is likely to enter sloping ground instead of when the lower traveling body 1 is traveling or is likely to travel on sloping ground in a downward direction. This is because when the shovel 500 performs work on sloping ground, the shovel 500 may tip over in the downward direction of the sloping ground, for example, according to the movement of the upper turning body 3 or the attachment, irrespective of whether the lower traveling body 1 travels or not. Furthermore, when the shovel 500 performs work on sloping ground, the lower traveling body 1 is likely to eventually travel in the downward direction of the sloping ground after the work is finished. In this case, the condition determining part 301 may determine, for example, at steps S704A, S704B, S804A, S804B, S904, S1004A, S1004B, S1104A, and S1104B as described above, whether or not the shovel 500 is on sloping ground or the shovel 500 is likely to enter sloping ground. Furthermore, according to this example, the usage check notification process and the second movement restricting process are executed by the occupant protection processing part 304, along with various processes (the warning outputting process, the first movement restricting process, the stable attitude teaching process, etc.) executed by the attitude stabilization processing part 303, while the occupant protection processing part 304 may execute only at least one of the usage check notification process and the second movement restricting process. The same is true for the second example and the third example of the attitude stabilization control device 200 described below.

Furthermore, the following is disclosed with respect to this example.

(1) A shovel including a traveling body;

a turning body turnably mounted on the traveling body; and an attachment attached to the turning body and including a boom, an arm, and a bucket, and further including a warning output part configured to output, when the traveling body is traveling or is likely to travel on sloping ground in a downward direction with the shovel being on the sloping ground, a warning to alert an operator to tipping of the shovel in the downward direction.

(2) The shovel as set forth in (1), wherein the warning output part is configured to output the warning when the shovel is in an unstable attitude that increases a chance of the tipping, when the traveling body is traveling or is likely to travel on the sloping ground in the downward direction with the shovel being on the sloping ground.

(3) The shovel as set forth in (1) or (2), further including:

a first movement restricting part configured to restrict a movement of the traveling body when the shovel is in an unstable attitude that increases a chance of the tipping, when the traveling body is traveling or is likely to travel on the sloping ground in the downward direction with the shovel being on the sloping ground.

(4) The shovel as set forth in (3), wherein the first movement restricting part is configured to restrict the movement of the traveling body when the shovel is in the unstable attitude that increases the chance of the tipping, when a predetermined time or more passes since the warning output part outputs the warning and the traveling body is still traveling or still likely to travel on the sloping ground in the downward direction with the shovel being on the sloping ground.

(5) The shovel as set forth in any of (1) to (4), further including:

a teaching part configured to teach the operator a stable attitude of the shovel that prevents the tipping, when the traveling body is traveling or is likely to travel on the sloping ground in the downward direction with the shovel being on the sloping ground.

(6) The shovel as set forth in (5), wherein the teaching part is configured to teach the operator the stable attitude when the shovel is in an unstable attitude that increases a chance of the tipping, when the traveling body is traveling or is likely to travel on the sloping ground in the downward direction with the shovel being on the sloping ground.

(7) The shovel as set forth in (5) or (6), wherein the teaching part is configured to teach the stable attitude by encouraging the operator to so operate the attachment as to bring the bucket closer to a ground.

(8) The shovel as set forth in (7), wherein the teaching part is configured to teach the stable attitude by encouraging the operator to so operate the turning body as to reduce a difference between a direction in which the attachment extends on the turning body and a travel direction of the traveling body as seen in a plan view.

(9) The shovel as set forth in any of (5) to (8), wherein the stable attitude corresponds to a posture state of the attachment where a height of the bucket from a ground is less than or equal to a first threshold determined with reference to a height dimension of a cabin.

(10) The shovel as set forth in (9), wherein the stable attitude corresponds to a turning state of the turning body where an angular difference between a direction in which the attachment extends on the turning body and a travel direction of the traveling body as seen in a plan view is less than or equal to a second threshold determined with reference to a widthwise positional relationship between the bucket and the traveling body as seen in the plan view.

(11) The shovel as set forth in any of (5) to (10), further including:

a display device provided in a cabin, wherein the teaching part is configured to teach the operator the stable attitude by displaying an image of the shovel corresponding to the stable attitude on the display device.

(12) The shovel as set forth in any of (1) through (11), further comprising:

a notification output part configured to output a notification to encourage closure of a window of a cabin or a notification to encourage wearing of a seat belt to the operator, when the traveling body is traveling or is likely to travel on the sloping ground in the downward direction with the shovel being on the sloping ground.

(13) The shovel as set forth in (12), wherein the notification output part is configured to output the notification to the operator when the window is not closed or the seat belt is not worn, when the traveling body is traveling or is likely to travel on the sloping ground in the downward direction with the shovel being on the sloping ground.

(14) The shovel as set forth in (12) or (13), further comprising:

a second movement restricting part configured to restrict a movement of the traveling body when the window is not closed or the seat belt is not worn, when the traveling body is traveling or is likely to travel on the sloping ground in the downward direction with the shovel being on the sloping ground.

(15) The shovel as set forth in (14), wherein the second movement restricting part configured to restrict the movement of the traveling body when the window is not closed or the seat belt is not worn, when a predetermined time or more passes since the notification output part outputs the notification and the traveling body is still traveling or is still likely to travel on the sloping ground in the downward direction with the shovel being on the sloping ground.

[Details of Operation of Second Example of Attitude Stabilization Control Device]

Next, a specific operation of the second example of the attitude stabilization control device 200 according to this embodiment is described.

According to this example, the controller 30 performs the attitude stabilization control and the occupant protection control when the upper turning body 3 is turning in such a manner as to orient the attachment in a downslope direction with the shovel 500 being on sloping ground. That is, the condition determining part 301 determines whether the upper turning body 3 is turning in such a manner as to orient the attachment in a downslope direction. This is because when the attachment approaches a downslope direction, an overturning moment to tip over the shovel 500 in the downward direction of sloping ground due to the self-weight of the attachment relatively increases, so that the shovel 500 may tip over in the downward direction. Furthermore, this is because when the attachment approaches a downslope direction, with the movement of the attachment, a reaction force that acts on the body (the upper turning body 3) from the attachment acts as an overturning moment to tip over the shovel 500 in the downward direction of sloping ground, so that the shovel 500 may tip over in the downward direction.

Specifically, the condition determining part 301 may determine whether the upper turning body 3 is turning in such a manner as to orient the attachment in a downslope direction, based on the measured values of a pilot pressure commensurate with the operating state of the upper turning body 3, an inclination angle, a turning angle, etc., input from the pressure sensor 29, the inclination sensor 40, the turning angle sensor 46, etc., respectively. More specifically, the condition determining part 301 may determine whether the shovel 500 is on sloping ground by calculating the inclination angle Θ of a work surface based on the measured value of the inclination angle of the work surface in two axes with reference to the upper turning body 3. The condition determining part 301 may determine whether the upper turning body 3 is turning in such a manner as to orient the attachment in a downslope direction based on the inclination angle Θ with reference to the upper turning body 3, the measured value of the turning angle of the upper turning body 3, the measured value of a pilot pressure commensurate with the operating state of the upper turning body 3, etc.

Hereinafter, the case where it is determined by the condition determining part 301 that the upper turning body 3 is turning in such a manner as to orient the attachment in a downslope direction may be simply referred to as "the case where the upper turning body 3 is turning in such a manner as to orient the attachment in a downslope direction."

Furthermore, the controller 30 may perform the attitude stabilization control and the occupant protection control when the upper turning body 3 is likely to turn in such a manner as to orient the attachment in a downslope direction. That is, the condition determining part 301 may determine whether the upper turning body 3 is likely to turn in such a manner as to orient the attachment in a downslope direction. According to this, the controller 30 can start the attitude stabilization control and the occupant protection control before the upper turning body 3 turns in such a manner as to orient the attachment in a downslope direction. Therefore, it is possible to increase the achievability of the attitude stabilization and occupant protection of the shovel 500 to further improve the safety of the shovel 500. In this case, being likely to turn in such a manner as to orient the attachment in a downslope direction may include the case where the shovel 500 is likely to enter sloping ground and the upper turning body 3 is likely to turn in such a manner as to orient the attachment in a downslope direction after the entry of the shovel 500.

For example, when the operator is seated in the operator seat, work is stopped for a predetermined time or more, and the orientation of the attachment is not a downward direction with the shovel 500 being on sloping ground, the condition determining part 301 may determine that work on the sloping ground is finished and the upper turning body 3 is likely to turn in such a manner as to orient the attachment in a downslope direction before traveling downward on the sloping ground.

Hereinafter, the case where it is determined by the condition determining part 301 that the upper turning body 3 is likely to turn in such a manner as to orient the attachment in a downslope direction may be simply referred to as "the case where the upper turning body 3 is likely to turn in such a manner as to orient the attachment in a downslope direction."

Thus, according to this example, the attitude stabilization control device 200 (the controller 30) performs the attitude stabilization control and the occupant protection control when the upper turning body 3 is turning in such a manner as to orient the attachment in a downslope direction or is likely to turn in such a manner as to orient the attachment in a downslope direction. That is, the control application condition includes that "the upper turning body 3 is turning in such a manner as to orient the attachment in a downslope direction or is likely to turn in such a manner as to orient the attachment in a downslope direction."

The details of processing associated with the attitude stabilization control by the attitude stabilization control device 200 (the controller 30) according to this example are implemented by replacing the process at steps S704A, S704B, S804A, S804B, and S904 with the process of determining "whether the upper turning body 3 is turning in such a manner as to orient the attachment in a downslope direction" in the above-described flowcharts of FIGS. 7A, 7B, 8A, 8B, and 9. Furthermore, the details of processing associated with the attitude stabilization control by the attitude stabilization control device 200 (the controller 30) according to this example may also be implemented by replacing the process at steps S704A, S704B, S804A, S804B, and S904 with the process of determining "whether the upper turning body 3 is likely to turn in such a manner as to orient the attachment in a downslope direction" in the above-described flowcharts of FIGS. 7A, 7B, 8A, 8B, and 9.

This makes it possible to prevent the tipping of the shovel 500 in the downward direction in a situation where the upper turning body 3 is turning or is likely to turn in such a manner as to orient the attachment in a downslope direction.

Furthermore, the details of processing associated with the occupant protection control by the attitude stabilization control device 200 (the controller 30) according to this example are implemented by replacing the process at steps S1004A, S1004B, 51104A, and S1104B with the process of determining "whether the upper turning body 3 is turning in such a manner as to orient the attachment in a downslope direction" in the above-described flowcharts of FIGS. 10A, 10B, 11A, and 11B. Furthermore, the details of processing associated with the occupant protection control by the attitude stabilization control device 200 (the controller 30) according to this example may also be implemented by replacing the process at steps S1004A, 51004B, S1104A, and S1104B with the process of determining "whether the upper turning body 3 is likely to turn in such a manner as to orient the attachment in a downslope direction" in the above-described flowcharts of FIGS. 10A, 10B, 11A, and 11B.

This makes it possible to encourage the operator to use the safety equipment and ensure the safety of an occupant who is not using the safety equipment in a situation where the upper turning body 3 is turning or is likely to turn in such a manner as to orient the attachment in a downslope direction.

[Details of Operation of Third Example of Attitude Stabilization Control Device]

Next, a specific operation of the third example of the attitude stabilization control device 200 according to this embodiment is described.

According to this example, the controller 30 performs the attitude stabilization control and the occupant protection control when the attachment is in a posture state corresponding to the unstable attitude or in the state of movement corresponding to the unstable movement of the shovel 500 on the assumption that the attachment is oriented in the downward direction of sloping ground, with the shovel 500 being on the sloping ground. That is, the condition determining part 301 determines whether the attachment is in a posture state corresponding to the unstable attitude or in the state of movement corresponding to the unstable movement of the shovel 500, when the shovel 500 is on sloping ground and it is assumed that the attachment is oriented in the downward direction of the sloping ground. This is because, for example, even if the attachment is not oriented in the downward direction of sloping ground, the attachment in a posture state where the bucket 6 is relatively high or in the state of movement that causes the bucket 6 to be relatively high may cause the tipping of the shovel 500 in the downward direction if the attachment is thereafter oriented in the downward direction, while remaining in the posture state or the operating state, by the turning of the upper turning body 3.

Specifically, the condition determining part 301 may determine whether or not the attachment is in a posture state corresponding to the unstable attitude or in the state of movement corresponding to the unstable movement of the shovel 500, based on the measured values of pilot pressures commensurate with the operating states of the lower traveling body 1 and the attachment, an inclination angle, etc., input from the pressure sensor 29, the inclination sensor 40, and the turning angle sensor 46, respectively, when the shovel 500 is on sloping ground and it is assumed that the attachment is oriented in the downward direction of the sloping ground. More specifically, the condition determining part 301 may determine whether the shovel 500 is on sloping ground by calculating the inclination angle Θ of a work surface based on the measured value of the inclination angle of the work surface in two axes with reference to the upper turning body 3. Furthermore, the condition determining part 301 may determine whether or not the attachment is in a posture state corresponding to the unstable attitude or in the state of movement corresponding to the unstable movement of the shovel 500 when it is assumed that the attachment is oriented in the downward direction of sloping ground, using the attitude information obtained by the attitude obtaining part 302.

Hereinafter, the case where it is determined by the condition determining part 301 that the attachment is in a posture state corresponding to the unstable attitude or in the state of movement corresponding to the unstable movement of the shovel 500 when the shovel 500 is on sloping ground and it is assumed that the attachment is oriented in the downward direction of the sloping ground may be simply referred to as "the case where the attachment is in a posture state corresponding to the unstable attitude or in the state of movement corresponding to the unstable movement of the shovel 500 when the shovel 500 is on sloping ground and it is assumed that the attachment is oriented in the downward direction of the sloping ground."

Furthermore, the controller 30 may perform the attitude stabilization control and the occupant protection control when the attachment is in a posture state corresponding to the unstable attitude or in the state of movement corresponding to the unstable movement of the shovel 500 on the assumption that the attachment is oriented in the downward direction of sloping ground, with the shovel 500 being likely to enter the sloping ground. That is, the condition determining part 301 may determine whether the attachment is in a posture state corresponding to the unstable attitude or in the state of movement corresponding to the unstable movement of the shovel 500, when the shovel 500 is likely to enter sloping ground and it is assumed that the attachment is oriented in the downward direction of the sloping ground. This enables the controller 30 to start the attitude stabilization control and the occupant protection control before the shovel 500 actually enters sloping ground. Therefore, it is possible to increase the achievability of the attitude stabilization and occupant protection of the shovel 500 to further improve the safety of the shovel 500.

Specifically, the condition determining part 301 may determine whether the shovel 500 is likely to enter sloping ground based on the topographic information of a work site recorded in advance in a non-volatile internal memory or the like, the detection information of a space recognition device mounted on the shovel 500, etc., and on the measured value of a pilot pressure commensurate with the state of movement of the lower traveling body 1.

Thus, according to this example, the attitude stabilization control device 200 (the controller 30) performs the attitude stabilization control and the occupant protection control when the attachment is in a posture state corresponding to the unstable attitude or in the state of movement corresponding to the unstable movement of the shovel 500, when the shovel 500 is on sloping ground or is likely to enter sloping ground and it is assumed that the attachment is oriented in the downward direction of the sloping ground. That is, the control application condition includes that "the attachment is in a posture state corresponding to the unstable attitude or in the state of movement corresponding to the unstable movement of the shovel 500 when the shovel 500 is on sloping ground or is likely to enter sloping ground and it is assumed that the attachment is oriented in the downward direction of the sloping ground."

The details of processing associated with the attitude stabilization control by the attitude stabilization control device 200 (the controller 30) according to this example are implemented by replacing the process at steps S704A, S704B, S804A, S804B, and S904 with the process of determining "whether the attachment is in a posture state corresponding to the unstable attitude or in the state of movement corresponding to the unstable movement of the shovel 500 when the shovel 500 is on sloping ground and it is assumed that the attachment is oriented in the downward direction of the sloping ground" in the above-described flowcharts of FIGS. 7A, 7B, 8A, 8B, and 9. Furthermore, the details of processing associated with the attitude stabilization control by the attitude stabilization control device 200 (the controller 30) according to this example may also be implemented by replacing the process at steps S704A, S704B, S804A, S804B, and S904 with the process of determining "whether the attachment is in a posture state corresponding to the unstable attitude or in the state of movement corresponding to the unstable movement of the shovel 500 when the shovel 500 is likely to enter sloping ground and it is assumed that the attachment is oriented in the downward direction of the sloping ground" in the above-described flowcharts of FIGS. 7A, 7B, 8A, 8B, and 9.

As a result, in a situation where orienting the attachment in a downward direction causes the attachment to be in a posture state corresponding to the unstable attitude or in the state of movement corresponding to the unstable movement of the shovel 500, it is possible to prevent the tipping of the shovel 500 in the downward direction.

Furthermore, the details of processing associated with the occupant protection control by the attitude stabilization control device 200 (the controller 30) according to this example are implemented by replacing the process at steps S1004A, 51004B, S1104A, and S1104B with the process of determining "whether the attachment is in a posture state corresponding to the unstable attitude or in the state of movement corresponding to the unstable movement of the shovel 500 when the shovel 500 is on sloping ground and it is assumed that the attachment is oriented in the downward direction of the sloping ground" in the above-described flowcharts of FIGS. 10A, 10B, 11A, and 11B. Furthermore, the details of processing associated with the occupant protection control by the attitude stabilization control device 200 (the controller 30) according to this example may also be implemented by replacing the process at steps S1004A, S1004B, 51104A, and S1104B with the process of determining "whether the attachment is in a posture state corresponding to the unstable attitude or in the state of movement corresponding to the unstable movement of the shovel 500 when the shovel 500 is likely to enter sloping ground and it is assumed that the attachment is oriented in the downward direction of the sloping ground" in the above-described flowcharts of FIGS. 10A, 10B, 11A, and 11B.

As a result, in a situation where orienting the attachment in a downward direction causes the attachment to be in a posture state corresponding to the unstable attitude or in the state of movement corresponding to the unstable movement of the shovel 500, it is possible to encourage the operator to use the safety equipment and ensure the safety of an occupant who is not using the safety equipment.

An embodiment of the present invention is described in detail above, but the present invention is not limited to the particular embodiment, and various variations and modifications may be made without departing from the scope of the present invention described in the claims.

For example, according to the above-described embodiment, all of the motion elements of the shovel 500, such as the lower traveling body 1, the upper turning body 3, the boom 4, the arm 5, and the bucket 6, are hydraulically driven, while one or some of them may be electrically driven. That is, a configuration, etc., disclosed in the above-described embodiment may also be applied to a hybrid shovel, an electric shovel, etc.

Furthermore, according to the above-described embodiment and variations, a usage check notification is output on condition that the shovel 500 is on sloping ground or is likely to enter sloping ground. This, however, is not a limiting configuration. For example, a usage check notification may be output not only when the shovel 500 is on sloping ground or is likely to enter sloping ground but also when the safety equipment is not used, such as when the window is open or the seat belt is not worn (namely, when the safety equipment non-usage condition is satisfied). According to this, it is possible to encourage an occupant such as an operator who is not using the safety equipment to use the safety equipment in situations other than where the shovel 500 is on sloping ground or is likely to enter sloping ground.

Likewise, according to the above-described embodiment and variations, the movement of the lower traveling body 1, etc., is restricted when the window is open or the seat belt is not worn, on condition that the shovel 500 is on sloping ground or is likely to enter sloping ground. This, however, is not a limiting configuration. Specifically, the movement of the lower traveling body 1, etc., may be restricted when the safety equipment is not used, such as when the window is open or the seat belt is not worn (namely, when the safety equipment non-usage condition is satisfied), regardless of whether or not the shovel 500 is on sloping ground or is likely to enter sloping ground. According to this, it is possible to ensure the safety of the operator who is not using the safety equipment in situations other than where the shovel 500 is on sloping ground or is likely to enter sloping ground.

What is claimed is:

1. A shovel comprising:
   a traveling body including a pair of right and left crawlers;
   a turning body turnably mounted on the traveling body;
   an attachment attached to the turning body and including a boom, an arm, and a bucket; and
   a hardware processor configured to output a warning through a display device or an audio output device or a combination thereof when the shovel is on sloping ground,
   wherein the hardware processor is configured to determine whether or not the traveling body is traveling on the sloping ground in a downward direction or is likely to travel on the sloping ground in the downward direction, and output the warning to alert an operator to tipping of the shovel in the downward direction of the sloping ground in response to determining that the traveling body is traveling or is likely to travel on the sloping ground in the downward direction.

2. A shovel comprising:
   a traveling body including a pair of right and left crawlers;
   a turning body turnably mounted on the traveling body;
   an attachment attached to the turning body and including a boom, an arm, and a bucket; and
   a hardware processor configured to output a warning through a display device or an audio output device or a combination thereof when the shovel is on sloping ground,
   wherein the hardware processor is configured to
      determine whether an orientation of the attachment matches a traveling direction of the traveling body traveling on the sloping ground in a downward direction and whether a height of the bucket from the sloping ground is more than a predetermined threshold,
      determine that the shovel is in an unstable attitude state that increases a chance of a tipping of the shovel in the downward direction of the sloping ground in response to determining that the orientation of the attachment does not match the traveling direction of the traveling body and the height of the bucket is more than the predetermined threshold, and
      output the warning, restrict a movement of the traveling body, the turning body or the attachment or a combination of one or more thereof, or output the warning and restrict the movement, in response to determining that the shovel is in the unstable attitude state.

3. The shovel as claimed in claim 2, wherein the hardware processor is configured to restrict the movement in response to determining that the shovel is in the unstable attitude state when the traveling body is still on the sloping ground after a predetermined time or more passes since the hardware processor outputs the warning.

4. A shovel comprising:
a traveling body including a pair of right and left crawlers;
a turning body turnably mounted on the traveling body;
an attachment attached to the turning body and including a boom, an arm, and a bucket; and
a hardware processor configured to determine whether the shovel is on sloping ground,
wherein the hardware processor is further configured to output a warning and teach the operator a stable attitude that prevents tipping of the shovel in a downward direction of the sloping ground through a display device or an audio output device or a combination thereof in response to determining that the shovel is on the sloping ground.

5. The shovel as claimed in claim 4, wherein the hardware processor is configured to determine whether the shovel is in an unstable attitude state that increases a chance of the tipping of the shovel in the downward direction of the sloping ground, and teach the operator the stable attitude in response to determining that the shovel is on the sloping ground and in the unstable attitude state.

6. The shovel as claimed in claim 4, wherein the hardware processor is configured to teach the stable attitude by encouraging the operator to so operate the attachment as to bring the bucket closer to a ground.

7. The shovel as claimed in claim 4, wherein the hardware processor is configured to teach the stable attitude by encouraging the operator to so operate the turning body as to reduce a difference between an orientation of the attachment and a travel direction of the traveling body.

8. The shovel as claimed in claim 4, wherein the stable attitude corresponds to a posture state of the attachment where a height of the bucket from the sloping ground is less than or equal to a threshold.

9. The shovel as claimed in claim 1, wherein the hardware processor is further configured to output, together with the warning, a notification to encourage closure of a window of a cabin or a notification to encourage wearing of a seat belt to the operator through the display device or the audio output device or the combination thereof, when the shovel is on the sloping ground.

10. The shovel as claimed in claim 9, wherein the hardware processor is further configured to restrict a movement of the traveling body, the turning body or the attachment or a combination of one or more thereof when the window is not closed or the seat belt is not worn, when the shovel is on the sloping ground.

\* \* \* \* \*